United States Patent
Hattori

(10) Patent No.: US 7,355,744 B2
(45) Date of Patent: Apr. 8, 2008

(54) IMAGE PROCESSING METHOD FOR SUPERIMPOSING HIGH-RESOLUTION CHARACTER DATA ON LOW-RESOLUTION IMAGE DATA

(75) Inventor: Hiroshi Hattori, Gifu-ken (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 953 days.

(21) Appl. No.: 10/809,397

(22) Filed: Mar. 26, 2004

(65) Prior Publication Data

US 2004/0246507 A1 Dec. 9, 2004

(30) Foreign Application Priority Data

Mar. 31, 2003 (JP) .............................. 2003-093273

(51) Int. Cl.
- *G06T 11/60* (2006.01)
- *G06K 9/36* (2006.01)
- *G06K 15/02* (2006.01)

(52) U.S. Cl. ..................... 358/1.2; 358/1.9; 358/1.11; 358/1.18; 358/540; 358/462; 382/266; 382/267; 382/269; 345/467; 345/469.1; 345/611

(58) Field of Classification Search ................ 358/1.2, 358/1.9, 2.99, 3.23, 3.27, 1.11, 447, 450, 358/462, 517, 525; 382/266, 267, 269; 345/469.1, 345/467, 611
See application file for complete search history.

(56) References Cited

U.S. PATENT DOCUMENTS

| | | | |
|---|---|---|---|
| 5,781,666 A | | 7/1998 | Ishizawa et al. |
| 5,956,470 A | * | 9/1999 | Eschbach ..................... 358/1.9 |
| 6,204,935 B1 | | 3/2001 | Soma et al. |
| 6,563,502 B1 | * | 5/2003 | Dowling et al. .......... 345/469.1 |
| 7,046,863 B2 | * | 5/2006 | Chang et al. ................ 382/299 |
| 2003/0107770 A1 | * | 6/2003 | Klatchko et al. ........... 358/3.21 |

FOREIGN PATENT DOCUMENTS

| | | |
|---|---|---|
| JP | A 8-139904 | 5/1996 |
| WO | WO 02/03133 A2 | 1/2002 |

* cited by examiner

*Primary Examiner*—Douglas Q. Tran
*Assistant Examiner*—Chan S Park
(74) *Attorney, Agent, or Firm*—Oliff & Berridge, PLC

(57) ABSTRACT

600 dpi binary character shape data is created from 600 dpi character data inputted by a PC and written sequentially to a memory. The 600 dpi character data inputted from the PC and 300 dpi image data are stored as 300 dpi 8-bit graphics data. Next, 600 dpi 8-bit multi-value graphics data is created by dividing each pixel in the 300-dpi 8-bit graphics data into four small pixels. First and second correction processes are performed using a first correction table and the superimposed data is printed at a uniform 600 dpi printing density.

12 Claims, 24 Drawing Sheets

FIG.3

| 600DPI BINARY DATA | 600DPI MULTI-VALUE DATA | FIRST CORRECTION DATA |
|---|---|---|
| $X_1$ — $X_2$ / $Y_1$ — $Y_2$ | $X_{11}$ — $X_{12}$ / $Y_{11}$ — $Y_{12}$ | $X_{21}$ — $X_{22}$ / $Y_{21}$ — $Y_{22}$ |

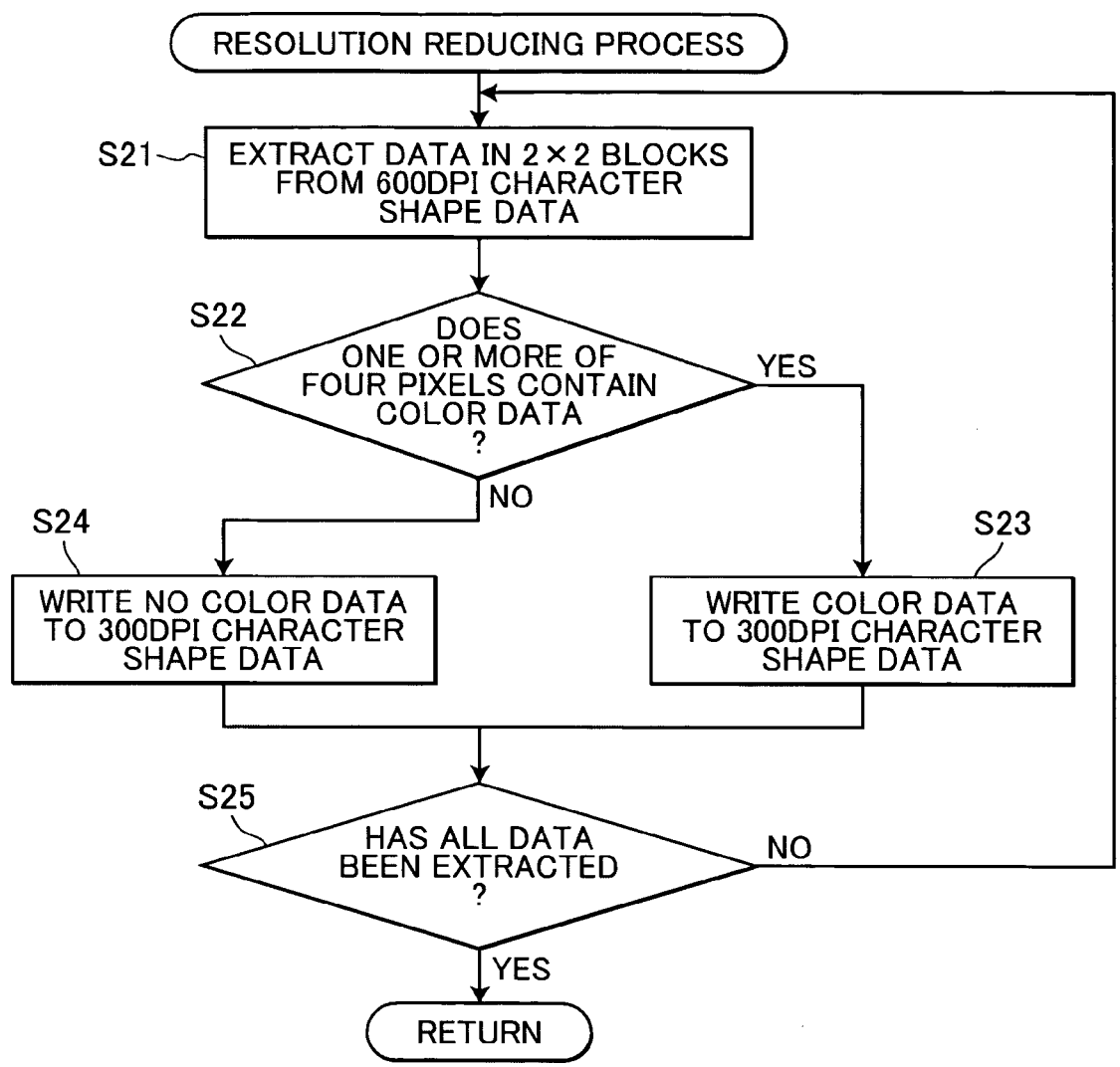

⇩ CREATE 300DPI CHARACTER DATA

FIG.8(A)
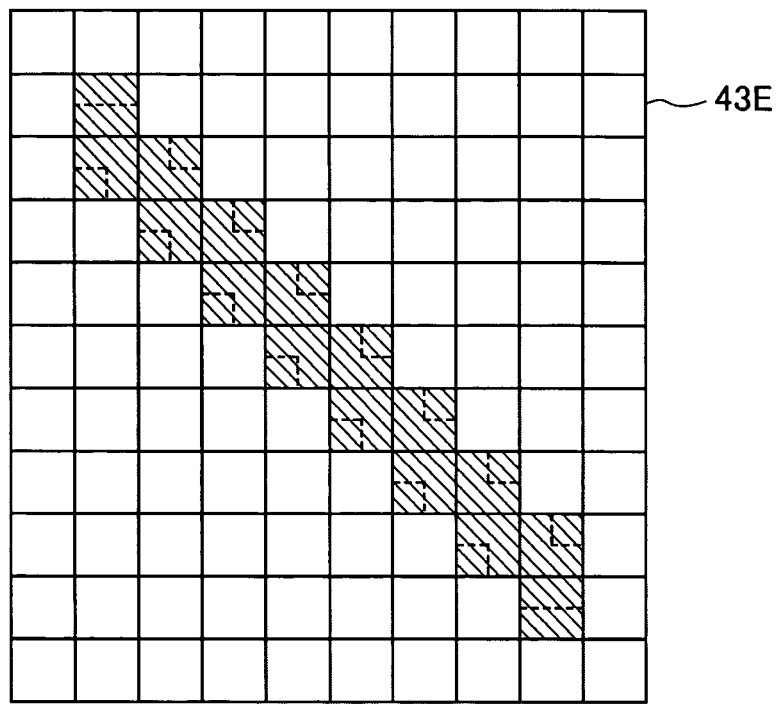
300DPI
43E
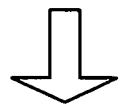 OVERWRITE WITH 300DPI GRAPHICS DATA (8-BIT MULTI-VALUE DATA)
FIG.8(B)
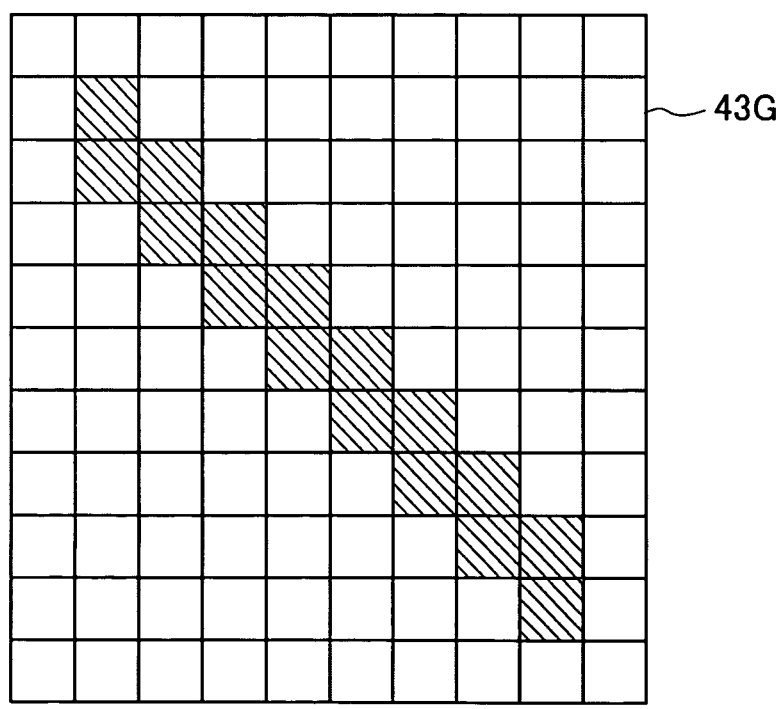
300DPI
43G FIG.9(A)
300DPI
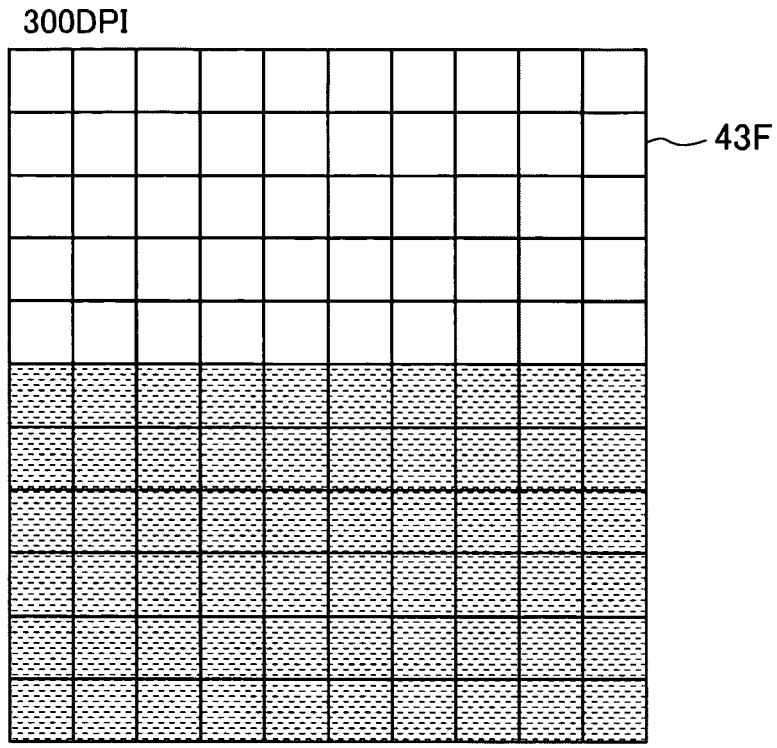
43F
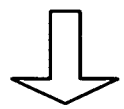
OVERWRITE WITH
300DPI GRAPHICS DATA
(8-BIT MULTI-VALUE DATA)
FIG.9(B)
300DPI
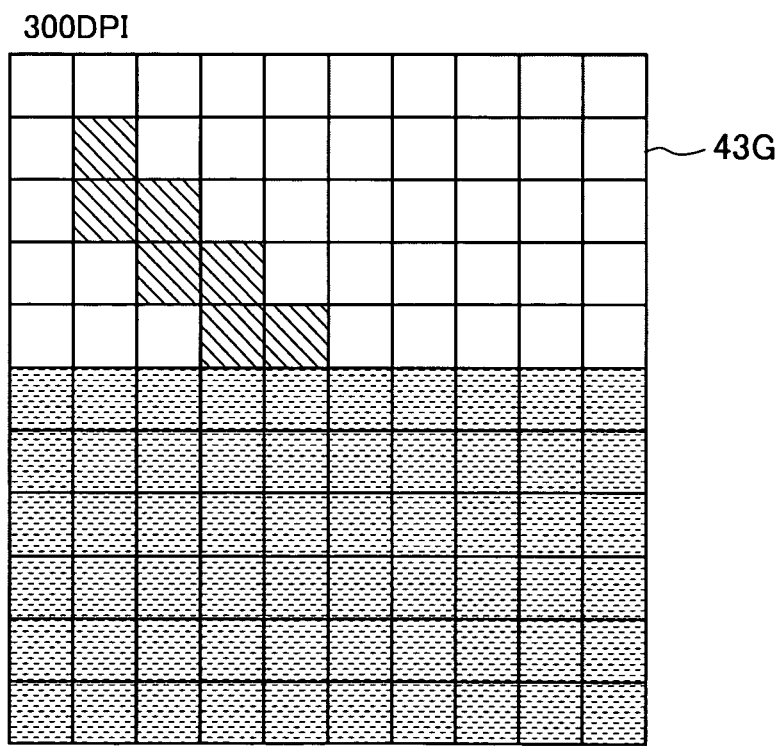
43G

600DPI　　　　CHARACTER

43C

⇩ OVERWRITE WITH 600DPI BINARY CHARACTER SHAPE DATA

600DPI

43D

600DPI  CHARACTER

43A

⇩ CREATE 300DPI CHARACTER DATA

300DPI

43E

FIG.12(A)
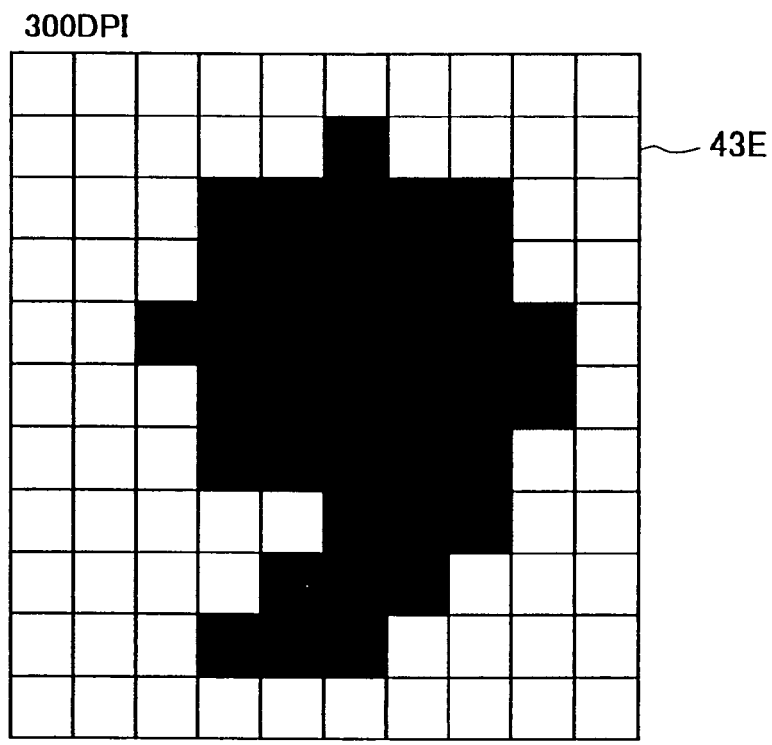
300DPI
43E
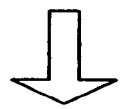
OVERWRITE WITH
300DPI GRAPHICS DATA
(8-BIT MULTI-VALUE DATA)
FIG.12(B)
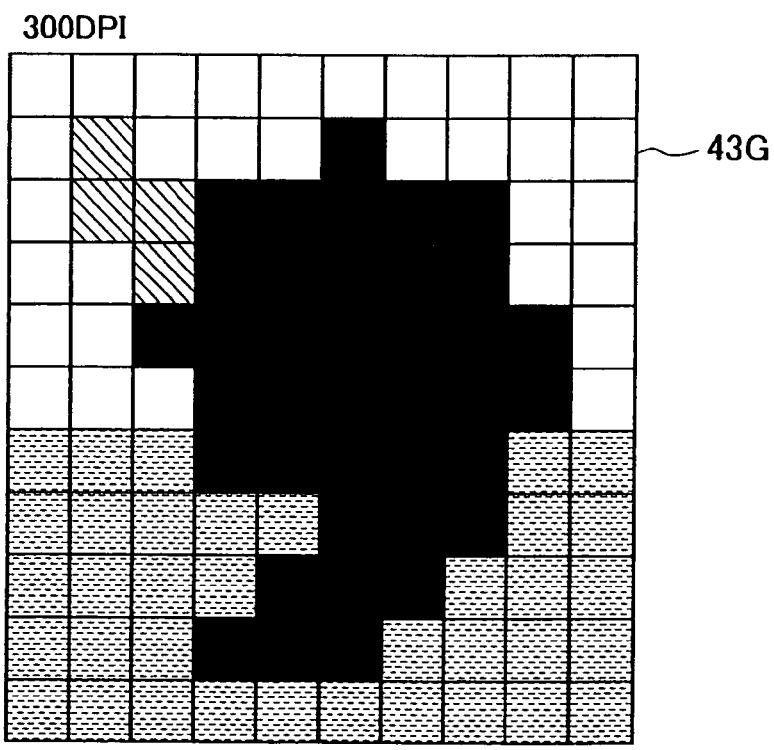
300DPI
43G

FIG.13(A)
300DPI
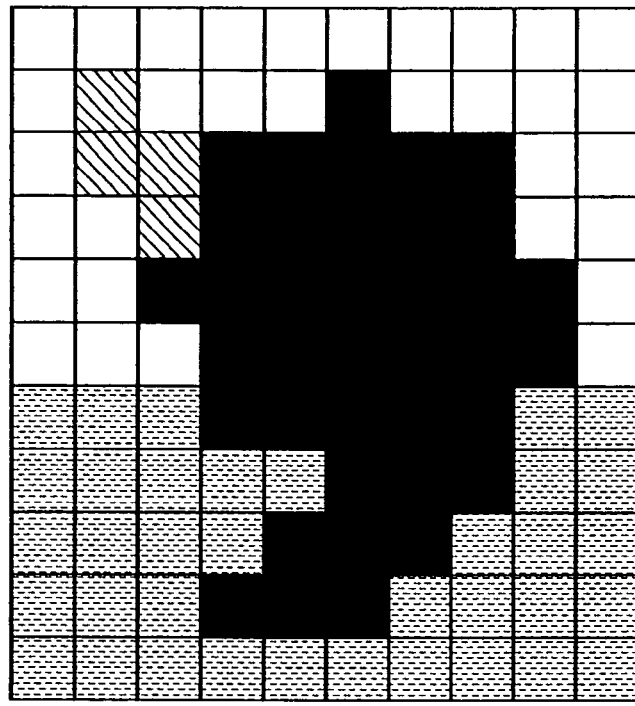
43G
 CONVERT INTO 600DPI MULTI-VALUE DATA
FIG.13(B)
600DPI
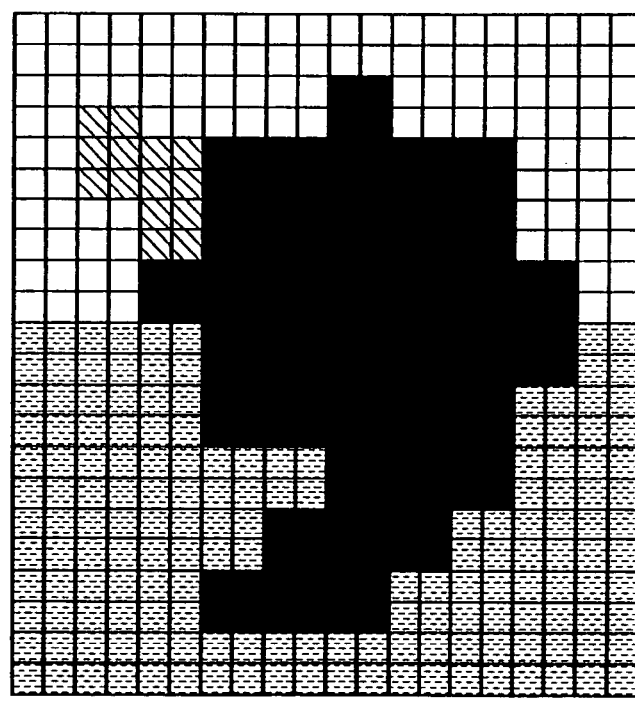
43H

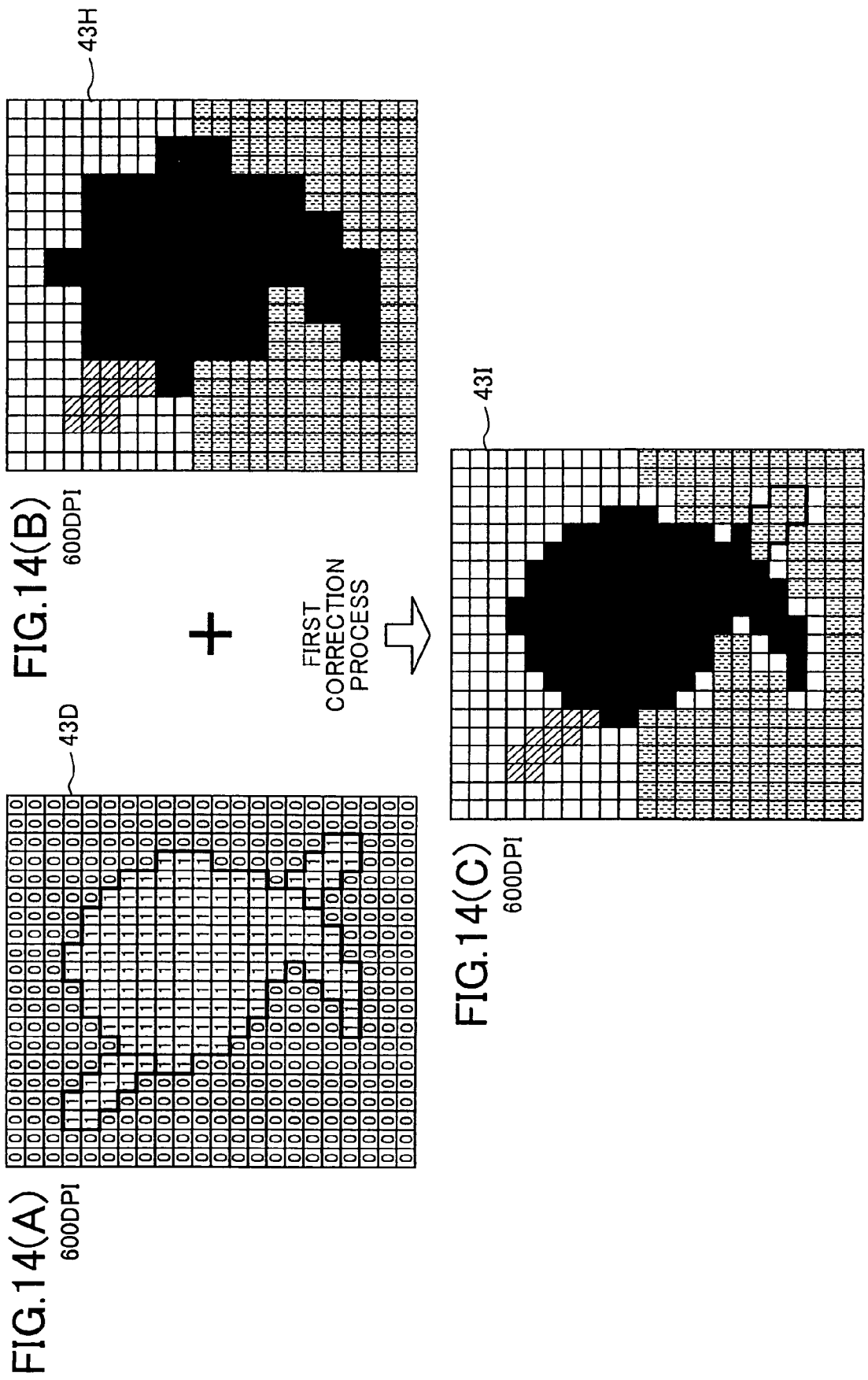

FIG.15(A)
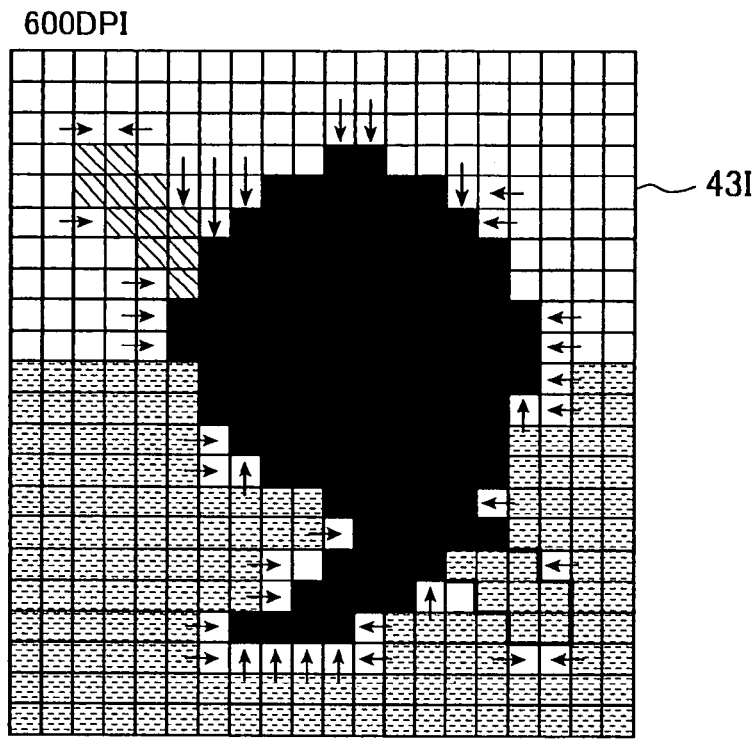
600DPI
43I
FIG.15(B)
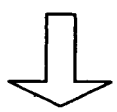 SECOND CORRECTION PROCESS
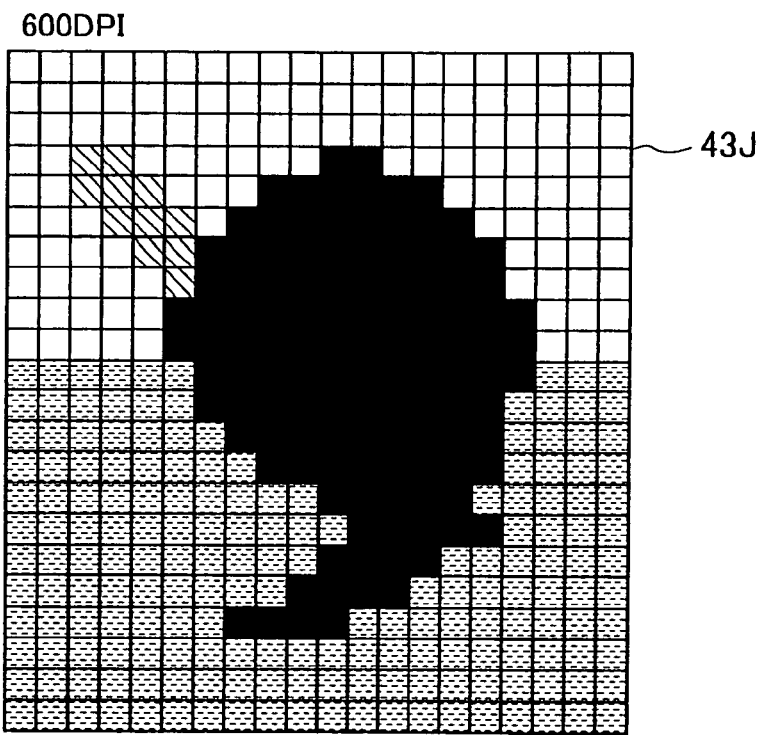
600DPI
43J

FIG.16(A)
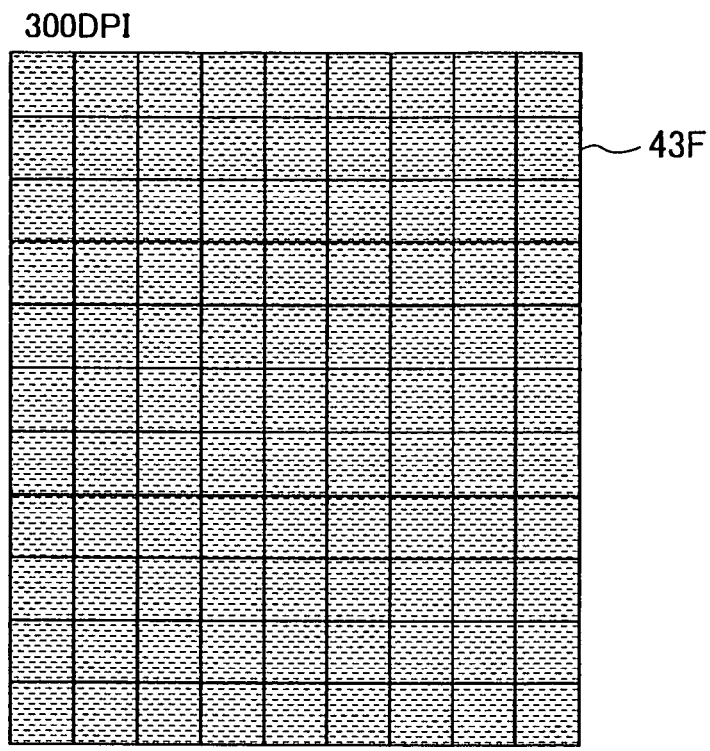
300DPI
43F
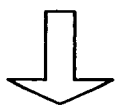  300DPI GRAPHICS DATA
(8-BIT MULTI-VALUE DATA)
FIG.16(B)
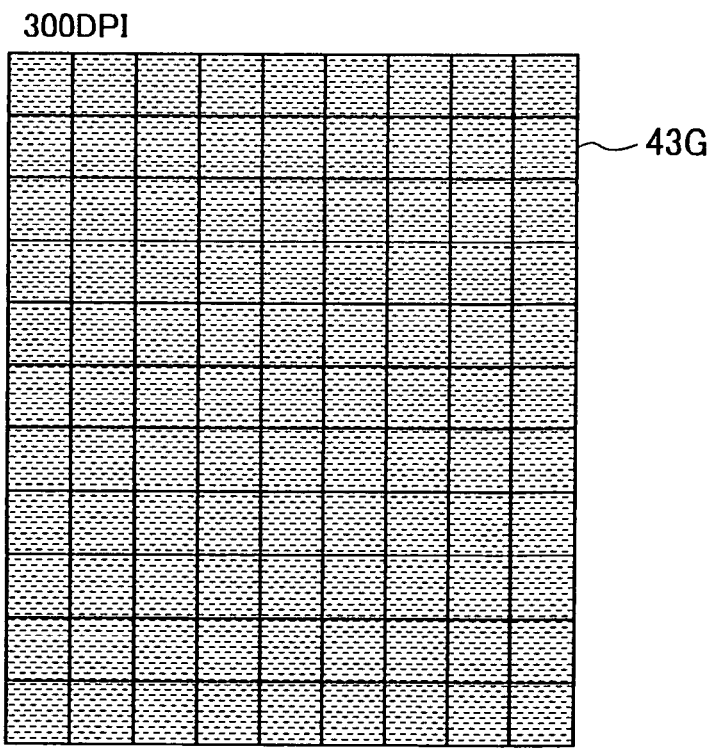
300DPI
43G

FIG.18(A)
600DPI  CHARACTER
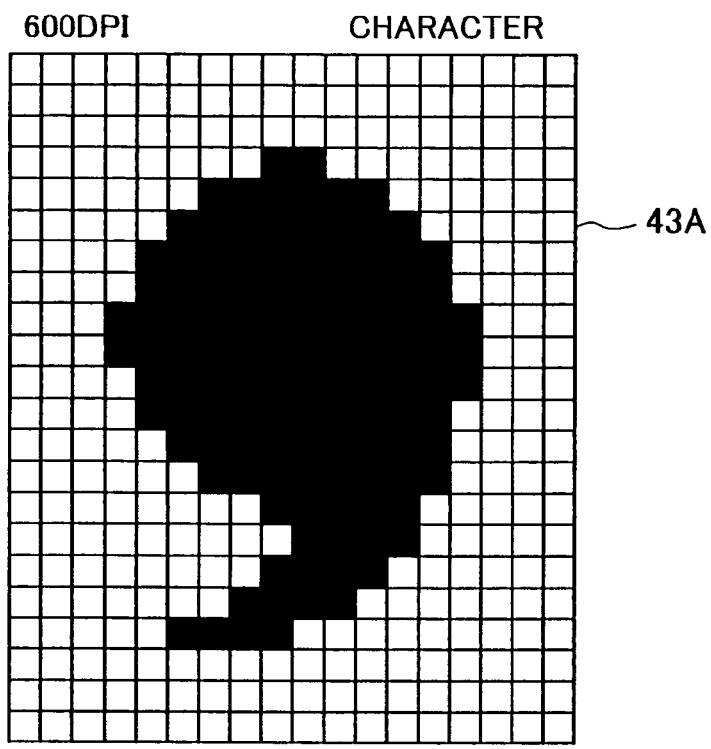
43A
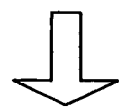 CREATE 300DPI CHARACTER DATA
FIG.18(B)
300DPI
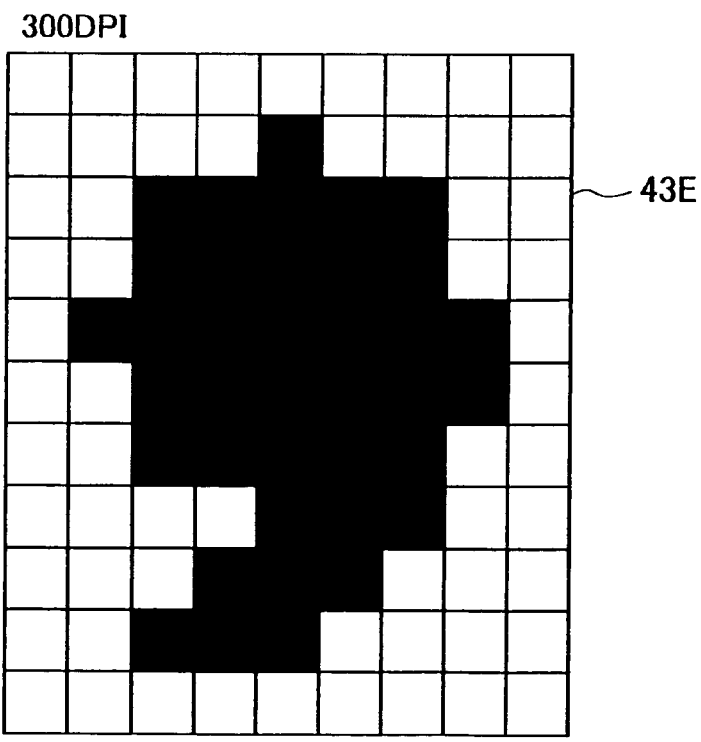
43E

FIG.19(A)
300DPI
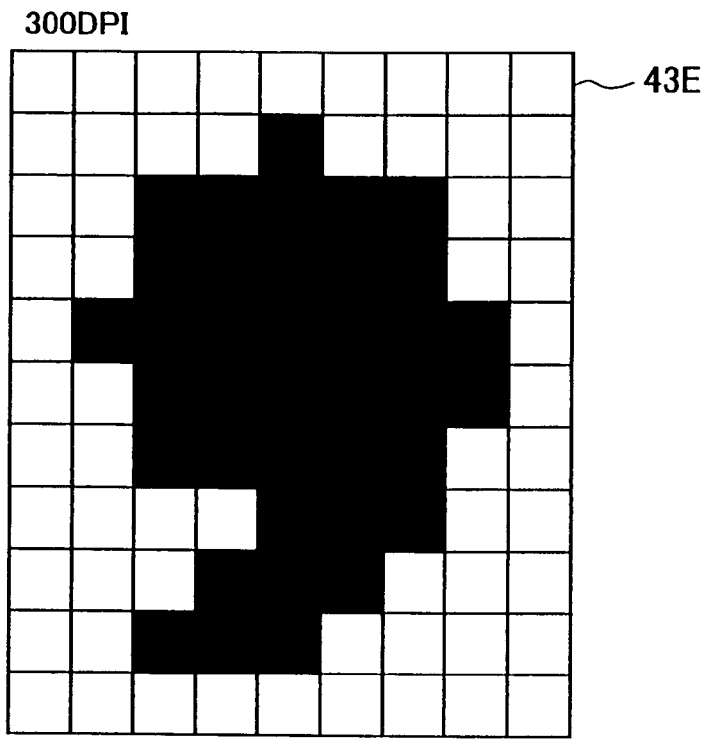
43E
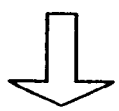 OVERWRITE WITH 300DPI GRAPHICS DATA (8-BIT MULTI-VALUE DATA)
FIG.19(B)
300DPI
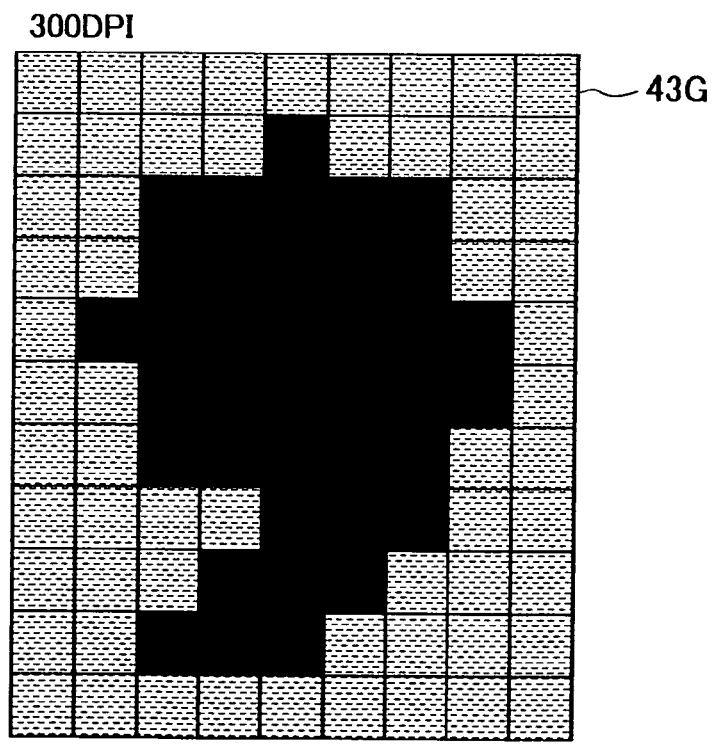
43G

FIG.20(A)
300DPI
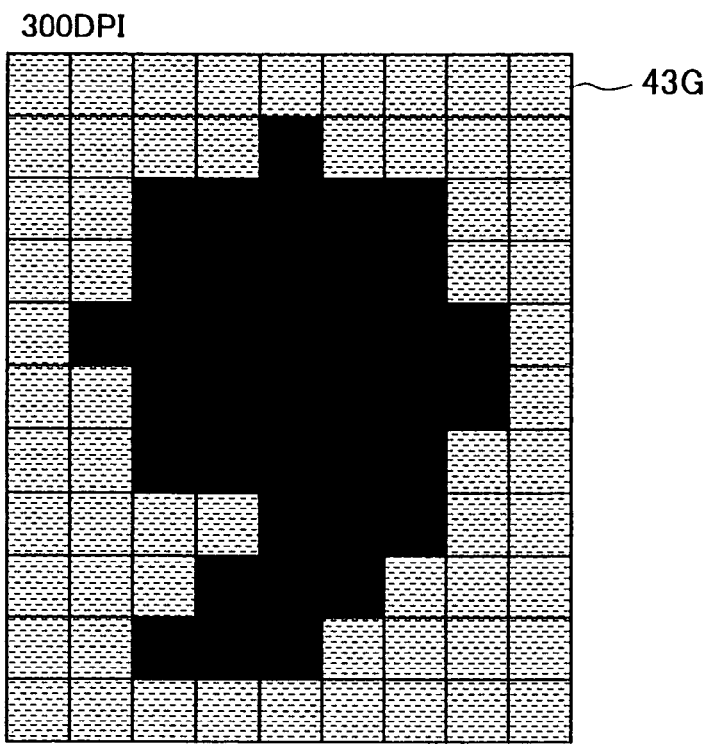
43G
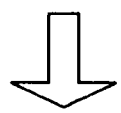 CONVERT INTO
600DPI MULTI-VALUE DATA
FIG.20(B)
600DPI
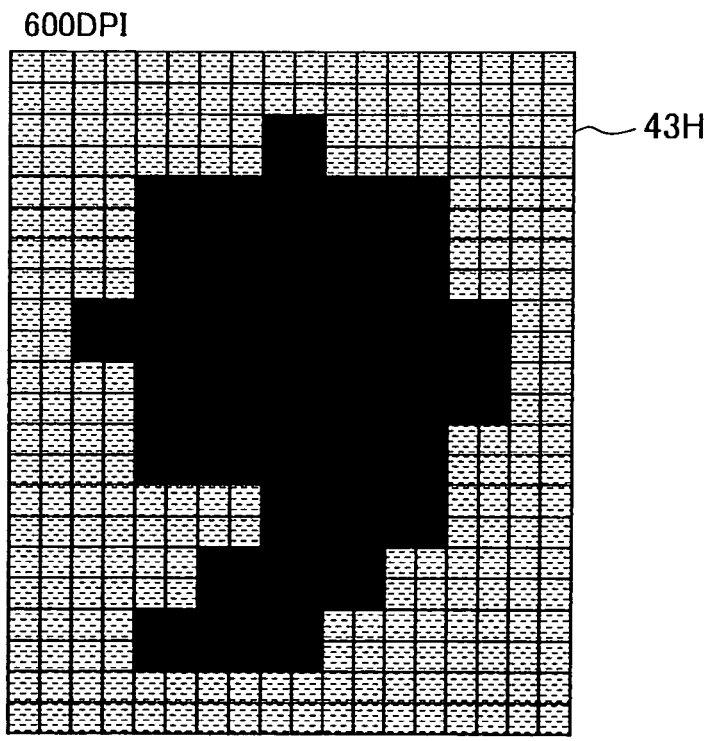
43H

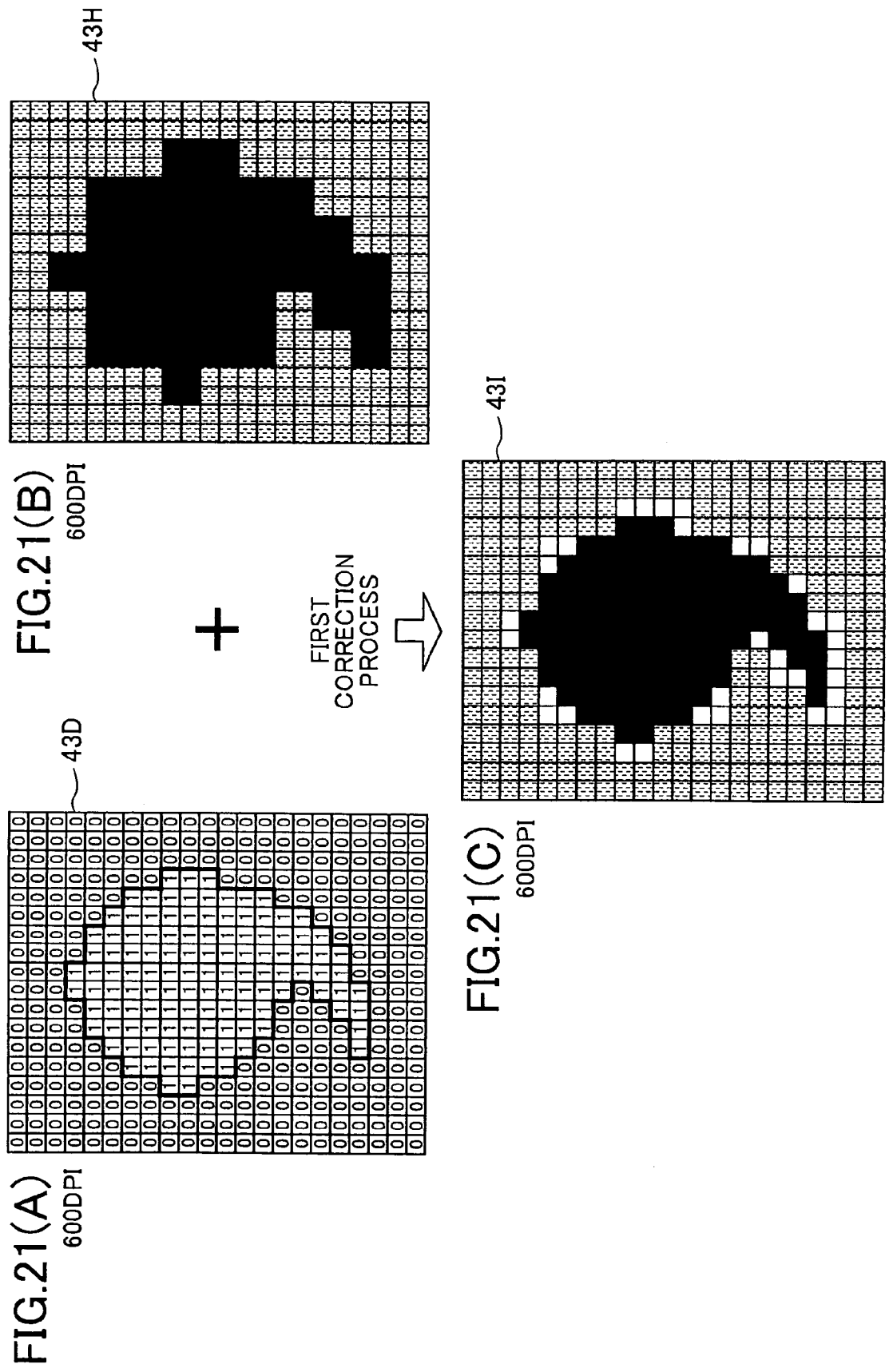

FIG.22(A)
600DPI
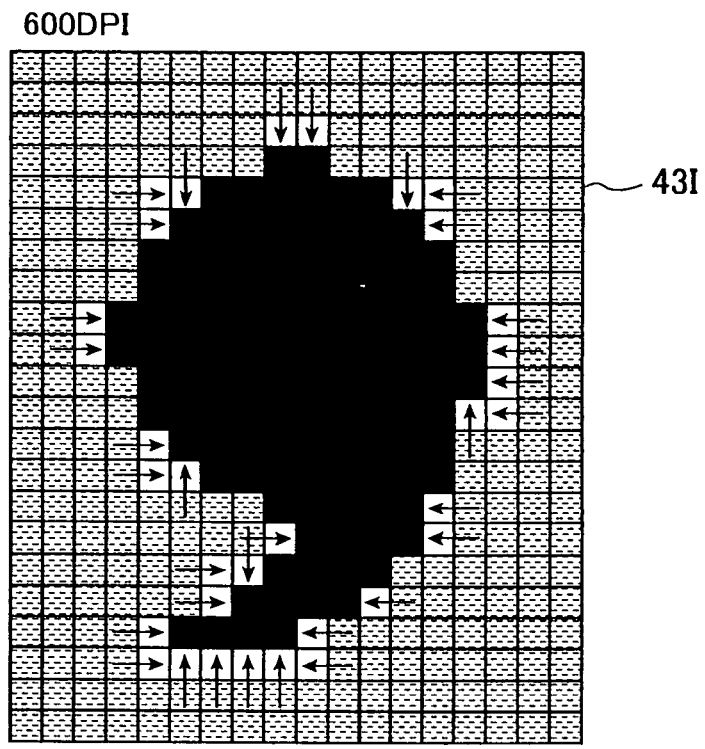
43I
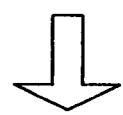 SECOND CORRECTION PROCESS
FIG.22(B)
600DPI
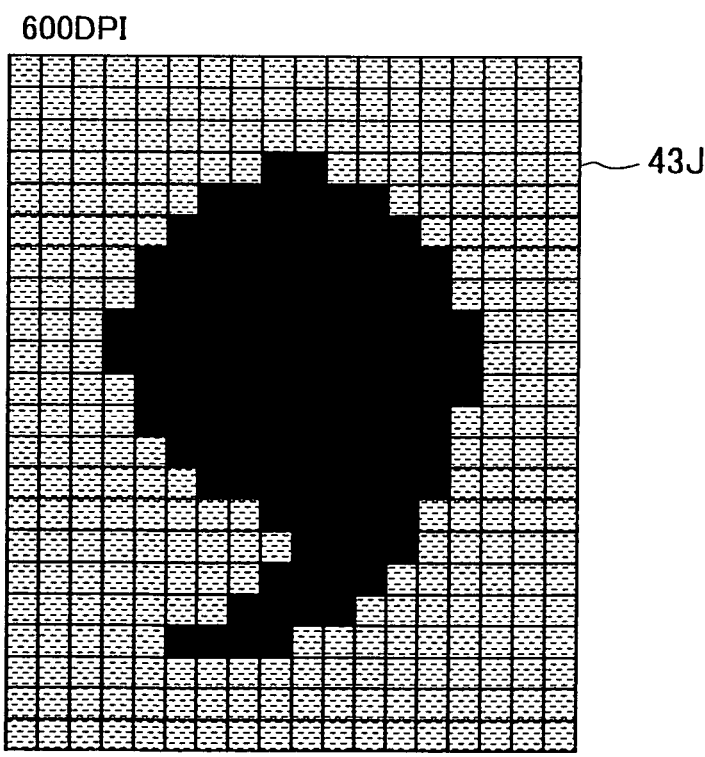
43J

FIG.24(A)
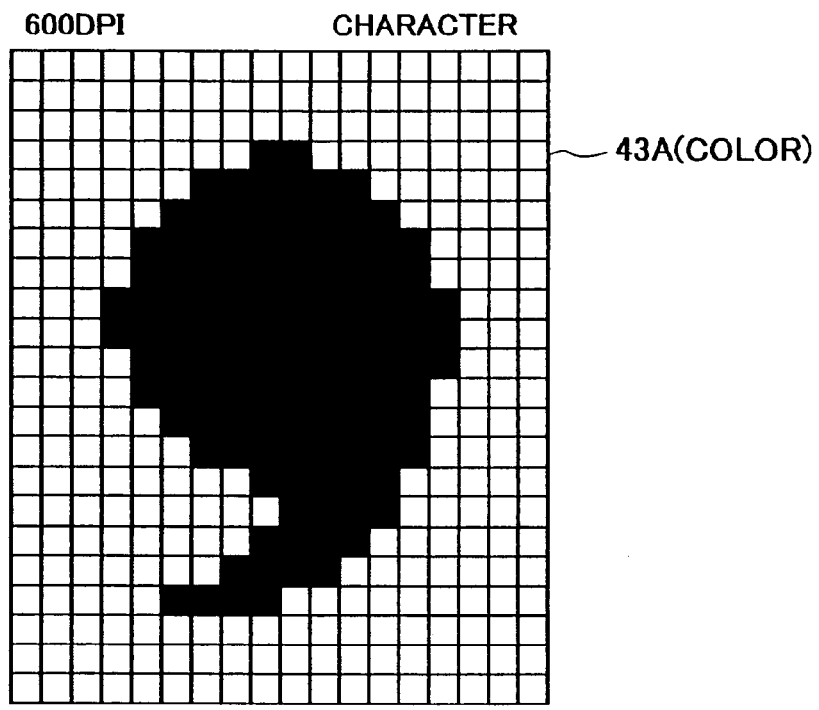
600DPI     CHARACTER
43A(COLOR)
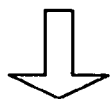
CREATE 300DPI CHARACTER DATA
FIG.24(B)
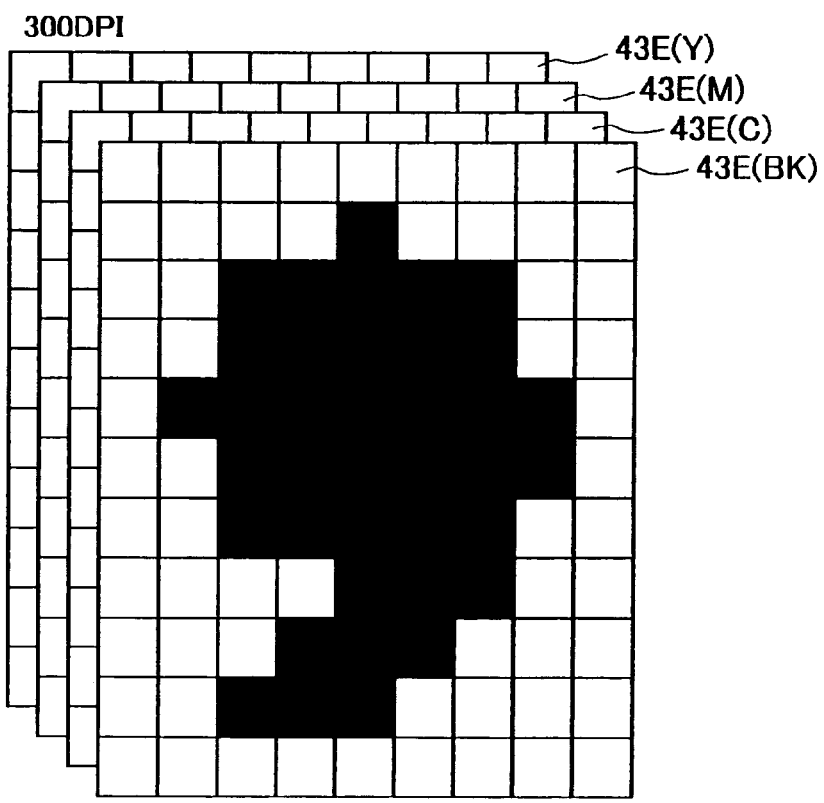
300DPI
43E(Y)
43E(M)
43E(C)
43E(BK)

IMAGE PROCESSING METHOD FOR SUPERIMPOSING HIGH-RESOLUTION CHARACTER DATA ON LOW-RESOLUTION IMAGE DATA

BACKGROUND OF THE INVENTION

1. Field of the Invention

The present invention relates to an image-processing device and an image-processing method, and particularly to an image-processing device and an image-processing method for superimposing high-resolution character data on low-resolution image data.

2. Related Art

Various image-processing devices and image-processing methods for superimposing high-resolution character data on low-resolution image data have been proposed. One such conventional image-processing device includes inputting means for inputting original image data of a prescribed resolution; determining means for determining whether the original image data inputted by the inputting means is character data or photographic data; character data generating means for generating binary character data based on data determined to be character data; photographic data generating means for generating multi-value photographic data with a resolution lower than the prescribed resolution, based on data determined to be photographic data; synthesizing means for synthesizing and developing the character data generated by the character data generating means and the photographic data generated by the photographic data generating means; and outputting means for outputting the image data synthesized and developed by the synthesizing means (Japanese Patent-Application Publication No. HEI-8-139904).

When original image data of a prescribed resolution is inputted into an image-processing device having this construction, the image-processing device determines whether the inputted image data is character data or photographic data. The image-processing device generates binary character data based on data determined to be character data and multi-value photographic data of a resolution lower than the prescribed resolution based on data determined to be photographic data. The image-processing device synthesizes and develops the character data generated by the character data generating means and the photographic data generated by the photographic data generating means and outputs the synthesized image data.

Hence, the image-processing device can reduce the amount of data in the entire image by binarizeing character data and processing photographic data as multi-value photographic data with low resolution. The image-processing device can also reduce the amount of time required for processing character data and thus the amount of time for processing the overall synthesized image. Further, the character portion of the image can be reproduced satisfactorily. It is also possible to reduce the time required to process the overall image data by performing a binarization process on the character portion of the image and by performing a process to reduce the resolution in the photographic portion of the image.

However, when all or part of the high-resolution character data is placed over low-resolution photographic data in the conventional image-processing device described above, the portion of character data placed over the photographic data is processed as low-resolution photographic data. Hence, the portion of the character drawn over the photograph is printed in a lower quality and, hence, suffers in appearance.

SUMMARY OF THE INVENTION

In view of the foregoing, it is an object of the present invention to provide an image-processing device and an image-processing method capable of printing characters with good quality, even when part or all of the high-resolution character data is superimposed over low-resolution photographic data.

In order to attain the above and other objects, according to one aspect of the present invention, there is provided an image-processing device including a first memory, a second memory, and a controller that converts a high-resolution character data to a high-resolution binary data, stores the high-resolution binary data into the first memory, converts the high-resolution character data to a low-resolution character data, stores the low-resolution character data and a low-resolution image data as low-resolution composite data into the second memory, converts the low-resolution composite data into a high-resolution multi-value composite data, corrects the high-resolution multi-value composite data to a corrected high-resolution multi-value composite data by using a logic filter table that employs the high-resolution binary data stored in the first memory, and corrects the corrected high-resolution multi-value composite data by assigning to a blank pixel in the corrected high-resolution multi-value composite data, that was generated when correcting the high-resolution multi-value composite data, one of a value of a pixel adjacent to the blank pixel and a blank value.

There is also provided an image-processing device including a first converting means for converting a high-resolution character data to a high-resolution binary data, a first storing means for storing the high resolution character data, a second converting means for converting the high-resolution character data to a low-resolution character data, a second storing means for storing the low-resolution character data and a low-resolution image data as low-resolution composite data, a third converting means for converting the low-resolution composite data into a high-resolution multi-value composite data, a first correcting means for correcting the high-resolution multi-value composite data by using a logic filter table that employs the high-resolution binary data stored in the first memory, and a second correcting means for correcting, the high-resolution multi-value composite data corrected by the first correcting means by assigning to blank pixels in the corrected high-resolution multi-value composite data that was generated when the first correcting means corrected the high-resolution multi-value composite data, one of a value of a pixel adjacent to the blank pixel and a blank value.

There is also provided an image-processing method for superimposing and outputting high-resolution character data and low-resolution image data. The image-processing method includes a) converting a high-resolution character data into a high-resolution binary data, b) developing and storing the high-resolution binary data in a high-resolution binary memory, c) converting the high-resolution character data to low-resolution character data, d) developing a low-resolution image data and the low-resolution character data converted from the high-resolution character data in a low-resolution multi-value memory, thereby storing a developed data in the low-resolution multi-value memory as a low-resolution composite data, e) converting the low-resolution composite data stored in the low-resolution multi-value memory into a high-resolution multi-value composite data, f) correcting the high-resolution multi-value composite data using a logic filter table that employs the high-resolution binary data stored in the high-resolution binary memory, and g) correcting the high-resolution multi-value composite data corrected in the step f) by assigning to a blank pixel in the high-resolution composite data generated through the step f) one of a value of a pixel adjacent to the blank pixel and a blank value.

BRIEF DESCRIPTION OF THE DRAWINGS

In the drawings:

FIG. 3 shows a first correction table stored in a first correction table storage area of a ROM in the laser printer according to the preferred embodiments of the present invention;

FIG. 6 is a flowchart representing a resolution reducing process that is executed in S5 of FIG. 4 according to a first embodiment of the present invention;

FIG. 8(A) shows the 300 dpi character data of FIG. 7(B);

FIG. 8(B) shows 300 dpi graphics data created from the 300 dpi character data of FIG. 8(B) according to the first embodiment;

FIG. 9(A) shows an example of 300 dpi graphics data created from 300 dpi image data inputted second into the laser printer according to the first embodiment;

FIG. 9(B) shows 300 dpi graphics data created by superimposing the 300 dpi graphics data of FIG. 9(A) over the 300 dpi graphic data shown in FIG. 8(B) according to the first embodiment;

FIG. 12(A) shows 300 dpi character data of FIG. 11(B);

FIG. 12(B) shows 300 dpi graphics data created by overwriting the 300 dpi graphics data shown in FIG. 9(B) with the 300 dpi graphics data shown in FIG. 12(A);

FIG. 13(A) shows the 300 dpi graphics data of FIG. 12(B);

FIG. 13(B) shows 600 dpi graphics data (8-bit multi-value data) created from the 300 dpi graphics data of FIG. 13(A) according to the first embodiment;

FIG. 14(A) shows the 600 dpi binary character shape data of FIG. 10(B);

FIG. 14(B) shows the 600 dpi graphics data of FIG. 13(B);

FIG. 14(C) shows 600 dpi graphics data (first correction data) created from the 600 dpi binary character shape data of FIG. 14(A) and the 600 dpi graphics data of FIG. 14(B) in a first correction process according to the first embodiment;

FIG. 15(A) shows the first correction data of FIG. 14(C);

FIG. 15(B) shows 600 dpi graphics data (second correction data) created from the first correction data of FIG. 5(A) in a second correction process according to the first embodiment;

FIG. 16(A) shows a second example of 300 dpi graphics data created from 300 dpi graphics data inputted first into the laser printer according to the first embodiment;

FIG. 16(B) shows 300 dpi graphics data created from the 300 dpi graphics data of FIG. 16(A) according to the first embodiment;

FIG. 18(A) shows a second example of 300 dpi character data inputted second into the laser printer;

FIG. 18(B) shows 300 dpi character data created from the 300 dpi character data of FIG. 18(A);

FIG. 19(A) shows the 300 dpi character data of FIG. 18(B);

FIG. 19(B) shows 300 dpi graphics data created by overwriting the 300 dpi graphics data of FIG. 16(B) with the 300 dpi character data of FIG. 19(A);

FIG. 20(A) shows 300 dpi graphics data of FIG. 19(B);

FIG. 20(B) shows 600 dpi graphics data (8-bit multi-value data) created from the 300 dpi graphics data of FIG. 19(B) according to the first embodiment;

FIG. 21(A) shows the 600 dpi binary character shape data of FIG. 17(B);

FIG. 21(B) shows the 600 dpi graphics data of FIG. 20(B);

FIG. 21(C) shows 600 dpi graphics data (first correction data) created from the 600 dpi binary character shape data of FIG. 21(A) and the 600 dpi graphics data of FIG. 21(B) in the first correction process according to the first embodiment;

FIG. 22(A) shows the first correction data of FIG. 21(C);

FIG. 22(B) shows 600 dpi graphics data (second correction data) created from the first correction data of FIG. 22(A) in the second correction process according to the first embodiment;

FIG. 24(A) shows an example of 600 dpi color character data inputted second into the laser printer according to a fifth embodiment; and FIG. 24(B) shows 300 dpi character data corresponding to colors black (BK), cyan (C), magenta (M), and yellow (Y) created from the 600 dpi color character data of FIG. 24(A) according to the fifth embodiment of the present invention.

PREFERRED EMBODIMENTS OF THE PRESENT INVENTION

Next, image-processing devices according to embodiments of the present invention will be described with reference to the attached drawings. In these embodiments, the present invention is applied to a laser printer.

First Embodiment

First, the overall structure of a laser printer 1 according to a first embodiment of the present invention will be described with reference to FIGS. 1 and 2.

Figure 1:
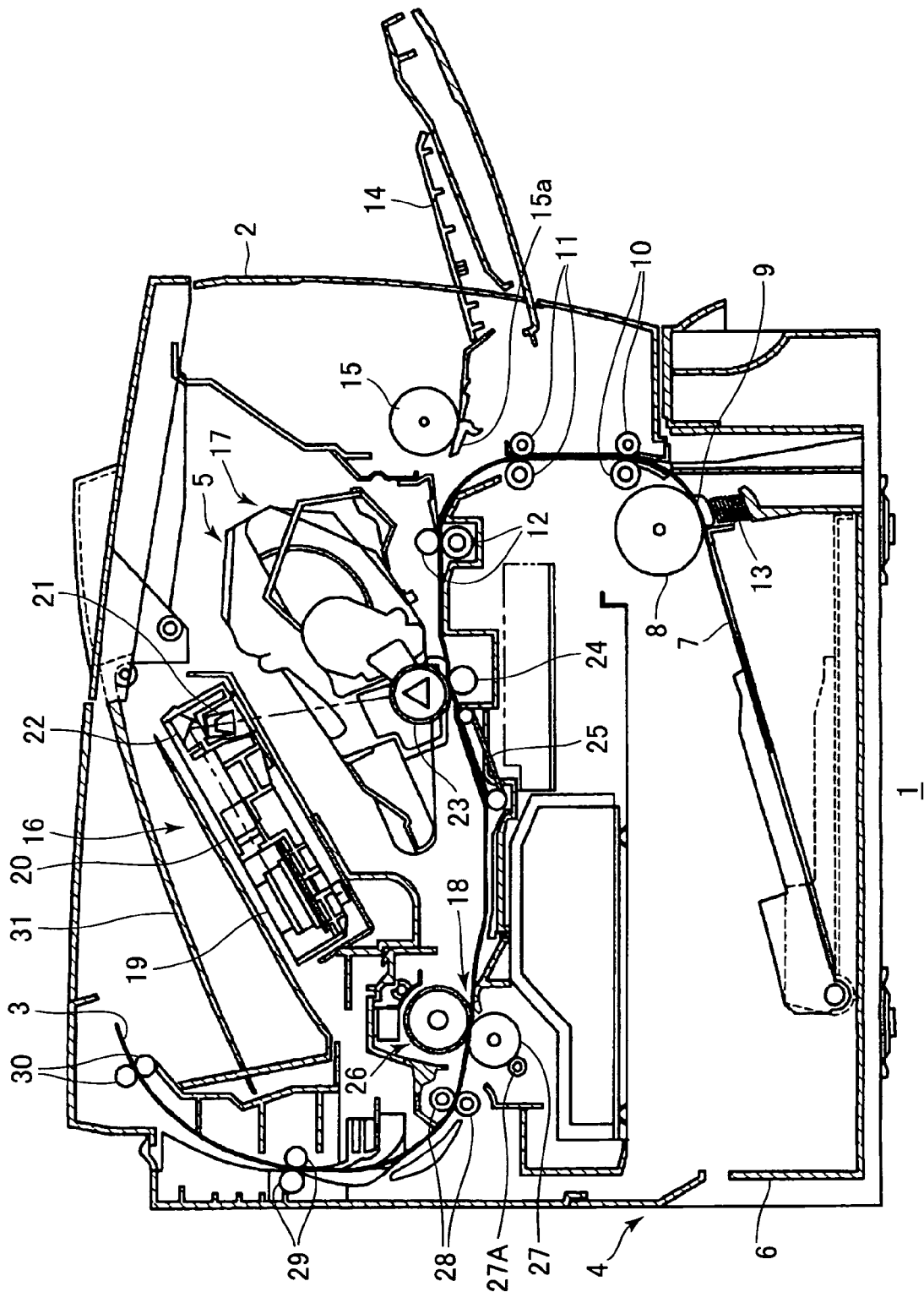
FIG. 1 is a side cross-sectional view showing the relevant construction of a laser printer according to preferred embodiments of the present invention.

As shown in FIG. 1, the laser printer 1 includes a main casing 2, a feeder unit 4, and an image-forming unit 5. The main casing 2 houses the feeder unit 4 and the image-forming unit 5. The feeder unit 4 is for feeding recording sheets 3, and the image-forming unit 5 is for forming prescribed images on the recording sheet 3.

The feeder unit 4 is disposed in the bottom section of the main casing 2 and includes a feed tray 6, a paper pressing plate 7, a feed roller 8, a separating pad 9, a pair of conveying rollers 10, a pair of conveying rollers 11, and a pair of registration rollers 12. The feed tray 6 is detachably mounted in the feeder unit 4. The paper pressing plate 7 is disposed in the feed tray 6. The feed roller 8 and the separating pad 9 are disposed above one end of the feed tray 6. The conveying rollers 10 and the conveying rollers 11 are provided downstream of the feed roller 8 in a sheet feed direction in which the recording sheet 3 is conveyed (hereinafter upstream or downstream in the sheet feed direction will be abbreviated as simply "upstream" or "downstream"). The registration rollers 12 are disposed downstream of the conveying rollers 10 and 11.

A spring 13 is disposed on the underside of the paper pressing plate 7 for pressing the topmost recording sheet 3 on the paper pressing plate 7 against the feed roller 8. As the feed roller 8 rotates, the topmost recording sheet 3 becomes interposed between the feed roller 8 and the separating pad 9 and is fed one sheet at a time. The conveying rollers 10 and 11 supply the recording sheet 3 fed by the feed roller 8 to the registration rollers 12. After adjusting the recording sheet 3 to a prescribed registration position, the registration rollers 12 supply the recording sheet 3 to the image-forming unit 5.

The feeder unit 4 further includes a multipurpose tray 14, a multipurpose feed roller 15, and a multipurpose separating pad 15a. The multipurpose feed roller 15 is for feeding recording sheets 3 stacked on the multipurpose tray 14. As the multipurpose feed roller 15 rotates, the recording sheets 3 stacked on the conveying belt 14 becomes interposed between the multipurpose feed roller 15 and the multipurpose separating pad 15a and is fed one sheet at a time.

The image-forming unit 5 includes a scanning unit 16, a process cartridge 17, a transfer roller 24, and a heat fixing unit 18.

The scanning unit 16 is disposed in the top section of the main casing 2 and includes a laser light-emitting unit (not shown), a polygon mirror 19 that can be driven to rotate, lenses 20 and 21, and a reflecting mirror 22.

The process cartridge 17 is disposed below the scanning unit 16 and is detachably mounted in the main casing 2. The process cartridge 17 includes a photosensitive drum 23, as well as a Scorotron charger, a developing roller, a toner accommodating unit, and the like (all of which are not shown in the drawings).

The toner accommodating unit is filled with a positive-charge non-magnetic single-component polymer toner serving as developer. The toner is carried on the developing roller in a predetermined thin thickness. The photosensitive drum 23 is rotatably disposed in confrontation with the developing roller. The photosensitive drum 23 is formed of a drum body that is grounded. A surface of the photosensitive drum 23 is formed of a positively-charging photosensitive layer of polycarbonate or the like.

As the photosensitive drum 23 rotates, the Scorotron charger applies a uniform positive charge across the entire surface of the photosensitive drum 23. Subsequently, the surface of the photosensitive drum 23 is exposed to high-speed scanning of a laser beam emitted from the scanning unit 16, forming electrostatic latent images on the surface based on prescribed image data. When the photosensitive drum 23 opposes the developing roller, the positively charged toner carried on the surface of the developing roller is selectively supplied to the electrostatic latent image on the photosensitive drum 23, i.e., to areas of the surface of the uniformly charged photosensitive drum 23 that were exposed to the laser beam and, therefore, have a lower potential than the rest of the surface. As a result, the electrostatic latent images on the photosensitive drum 23 are transformed into visible toner images. In this way, a reverse development is performed.

The transfer roller 24 is rotatably supported on the main casing 2 at a position below and in opposition to the photosensitive drum 23. The transfer roller 24 includes a metal roller shaft covered by a roller that is formed of an electrically conductive rubber material. A prescribed transfer bias with respect to the photosensitive drum 23 is applied to the transfer roller 24. Accordingly, the visible toner image on the photosensitive drum 23 is transferred to the recording sheet 3, as the recording sheet 3 passes between the photosensitive drum 23 and the transfer roller 24. After the visible toner image is transferred in this way, the recording sheet 3 is conveyed to the heat fixing unit 18 by a conveying belt 25.

The heat fixing unit 18 is disposed downstream of the process cartridge 17 and includes a heat roller 26, a pressure roller 27, and a cleaning roller 27A. The pressure roller 27 is disposed opposing the heat roller 26 with the recording sheet 3 interposed therebetween. The cleaning roller 27A opposes the pressure roller 27. The peripheral surface of the pressure roller 27, which is not grounded, is covered with an insulating resin, such as a fluorocarbon resin. The cleaning roller 27A is rotatably supported and urged toward the pressure roller 27.

After being fixed in the heat fixing unit 18, the recording sheet 3 is conveyed to a pair of discharge rollers 30 by pairs of conveying rollers 28 and 29 disposed downstream of the heat fixing unit 18. The discharge rollers 30 subsequently discharge the recording sheet 3 onto a discharge tray 31.

Next, the configuration of a control unit 40 provided in the laser printer 1 will be described with reference to FIG. 2.

Figure 2:
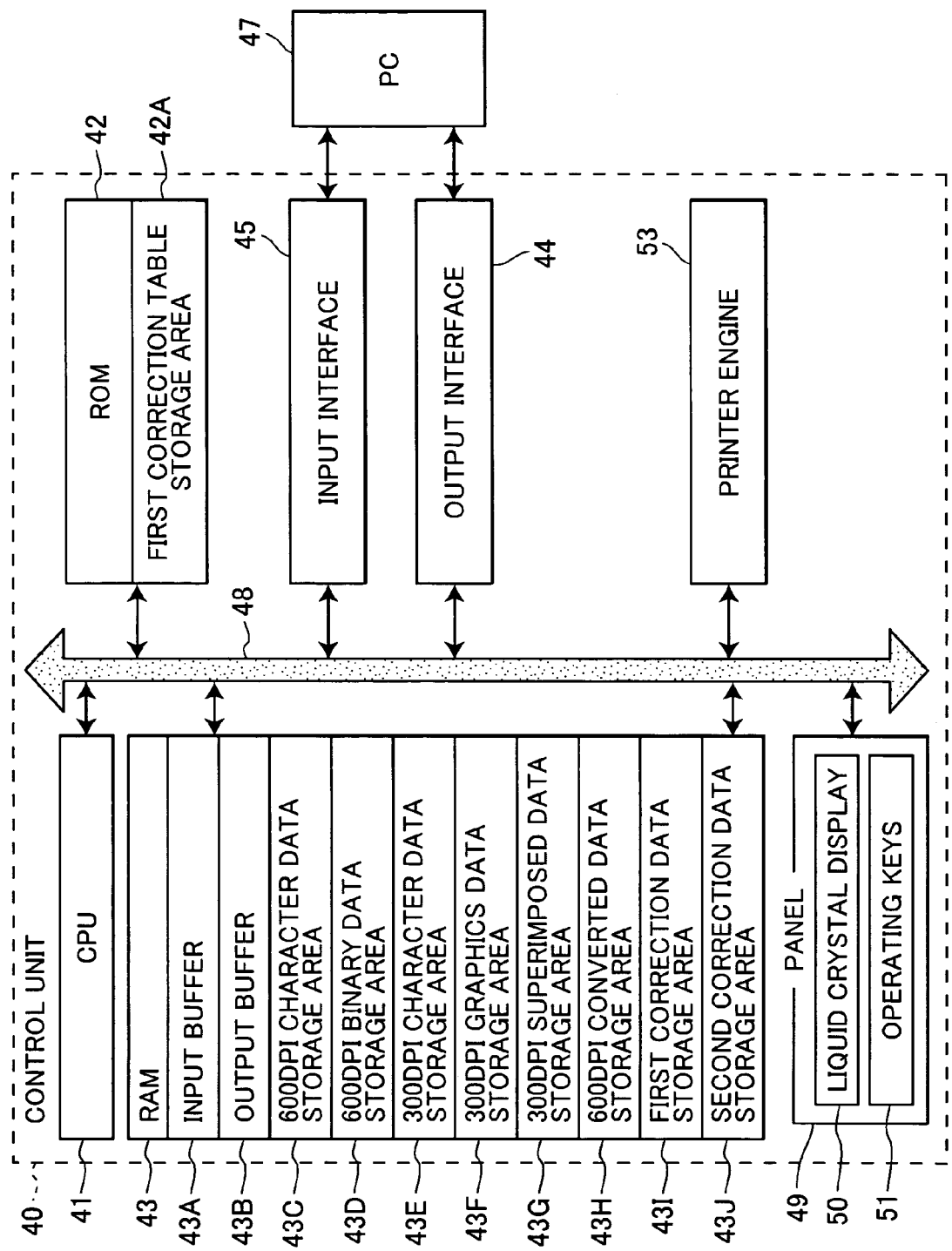
FIG. 2 is a block diagram showing the relevant components in a control unit of the laser printer according to the preferred embodiments of the present invention.

As shown in FIG. 2, the control unit 40 includes a central processing unit (CPU) 41, a read only memory (ROM) 42, a random access memory (RAM) 43, an output interface 44, an input interface 45, a bus 48, a panel 49, and a printer engine 53. An external personal computer (PC) 47 is connected to the control unit 40 via the output interface 44 and the input interface 45 and can input image data of 300 dpi or character data of 600 dpi, as described later.

The CPU 41 controls overall operations of the laser printer 1, including operations of the printer engine 53 (that is, the feeder unit 4 and the image-forming unit 5) and communications via the output interface 44 and the input interface 45, by executing various programs stored in the ROM 42 described later.

The ROM 42 stores various control programs including a correction program described later. The ROM 42 includes a first correction table storage area 42A in which a first correction table 55 shown in FIG. 3 is stored. As shown in FIG. 3, the first correction table 55 includes 600 dpi binary data, 600 dpi multi-value data, and first correction data. Details will be described later.

The RAM 43 temporarily stores numerical values, programs, and the like that enable the CPU 41 to execute various control processes. The RAM 43 includes an input buffer 43A and an output buffer 43B. As will be described in more detail below, the RAM 43 also includes a 600 dpi character data storage area 43C, a 600 dpi binary data storage area 43D, a 300 dpi character data storage area 43E, a 300 dpi graphics data storage area 43F, a 300 dpi superimposed data storage area 43G, a 600 dpi converted data storage area 43H, a first correction data storage area 43I, and a second correction data storage area 43J.

The 600 dpi character data storage area 43C stores 600 dpi character data. The 600 dpi binary data storage area 43D sequentially stores 600 dpi binary character shape data. The 300 dpi character data storage area 43E sequentially stores character data that has been converted from 600 dpi to 300 dpi, while the 300 dpi graphics data storage area 43F sequentially stores 300 dpi graphics data superimposed one on the other. The 300 dpi superimposed data storage area 43G sequentially stores 300 dpi graphics data which is a composite data of 300 dpi character data and 300 dpi image data. The 600 dpi converted data storage area 43H stores 600 dpi graphics data that has been converted from 300 dpi graphics data. The correction data storage area 43I stores graphics data that has undergone a first correction process. The second correction data storage area 43J stores graphics data that has undergone a second correction process. The areas 43C through 43J are initialized at startup.

The output interface 44 and the input interface 45 are capable of connecting to the external PC 47 according to a parallel interface or a serial interface, or via a telephone line, a LAN, or the like.

The bus 48 is a circuit for connecting the CPU 41, the output interface 44, the input interface 45, the ROM 42, the RAM 43, the panel 49, and the printer engine 53 to one another so that various data and signals can be exchanged among these components.

The panel 49 is disposed on the top front of the main casing 2 and includes a liquid crystal display 50 and operating keys 51. The liquid crystal display 50 includes an LCD panel, by which the CPU 41 displays the current status of the laser printer 1 and other data.

FIRST EXAMPLE

Next, an image process executed by the laser printer 1 will be described with reference to FIGS. 4-15. The laser printer 1 executes the image process when data is inputted from the external PC 47 for superimposing 600 dpi character data and 300 dpi image data and outputting the result. In the following explanation, it is assumed that 600 dpi character data, 300 dpi image data, and another 600 dpi character data are inputted in this order into the laser printer 1 from the external PC 47.

Figure 4:
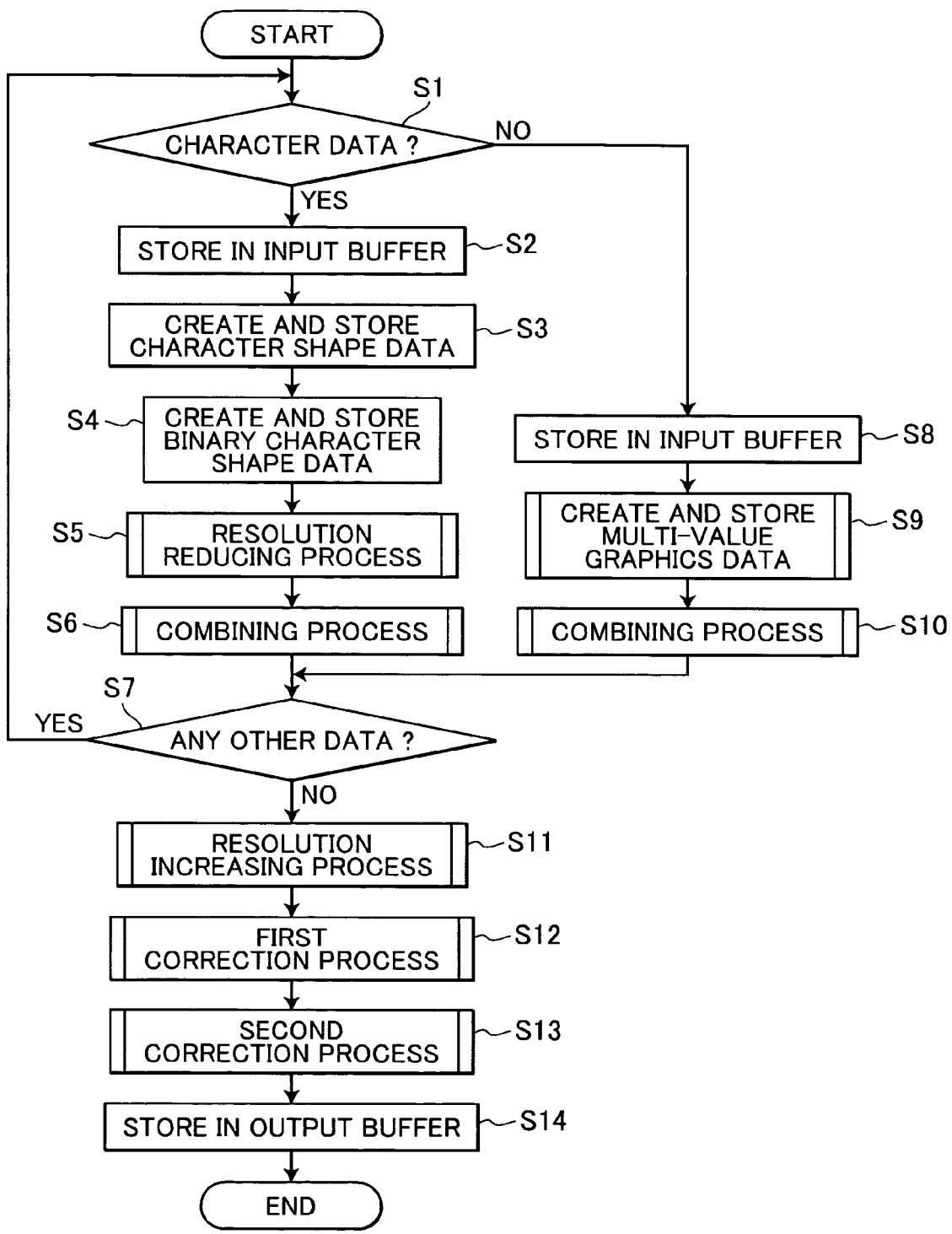
FIG. 4 is a flowchart representing a image process for superimposing and outputting 600 dpi character data and 300 dpi image data according to the preferred embodiments.

As shown in the flowchart of FIG. 4, the CPU 41 determines in S1 whether or not the inputted data is character data (600 dpi character data). If so (S1:YES), then in S2, the CPU 41 temporarily stores the 600 dpi character data and color (multi-value) data into the input buffer 43A. In S3, the CPU 41 creates 600 dpi character shape data from the 600 dpi character data temporarily stored in the input buffer 43A and stores the 600 dpi character shape data into the 600 dpi character data storage area 43C.

Next, in S4, the CPU 41 reads the 600 dpi character shape data from the 600 dpi character data storage area 43C, stores a "1" in the pixels of the 600 dpi binary data storage area 43D corresponding to pixels in which the character shape data was stored, and stores a "0" in pixels of the 600 dpi binary data storage area 43D corresponding to pixels in which no character shape data has been stored. Through this process, the CPU 41 stores 600 dpi binary character shape data in the 600 dpi binary data storage area 43D.

Figures 5A, 5B:
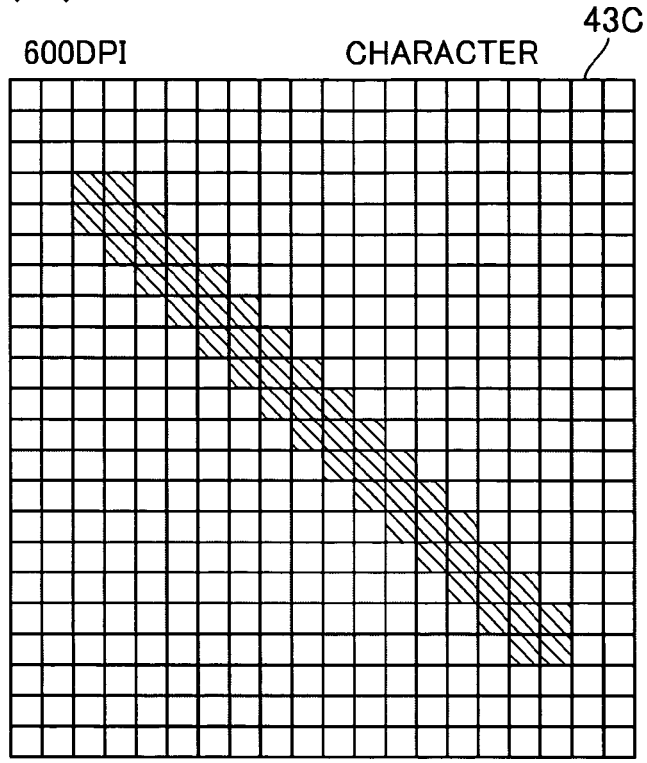
FIG. 5(A) shows an example of 600 dpi character shape data that was inputted first into the laser printer according to a first embodiment of the present invention.
FIG. 5(B) shows 600 dpi character shape data created from the 600 dpi character shape data of FIG. 5(A) according to the first embodiment of the present invention.

More specifically, as shown in FIGS. 5(A) and 5(B), the data "1" is stored in each pixel of the 600 dpi binary data storage area 43D corresponding to pixels of the 600 dpi character data storage area 43C in which 600 dpi character shape data has been stored, and the data "0" is stored in each pixel corresponding to pixels in which 600 dpi character shape data has not been stored. In this manner, 600 dpi binary character shape data is created from the 600 dpi character shape data and stored in the 600 dpi binary data storage area 43D as shown in FIG. 5(B).

Next, in S5, the CPU 41 executes a resolution reducing process for converting the 600 dpi character data stored in the input buffer 43A to 300 dpi character data. FIG. 6 shows the flowchart representing the resolution reducing process. In S21, the CPU 41 consecutively reads four small pixels, including two pixels in the main scanning direction by two pixels in the sub-scanning direction, from the 600 dpi character data stored in the input buffer 43A.

Next in S22, the CPU 41 determines whether or not one or more of these four small pixels possesses color data or other character data. That is, the CPU 41 determines whether or not at least one of these four small pixels possesses color data or other character data. If one or more of the four small pixels possesses color data or other character data (S22:YES), then in S23, the CPU 41 stores the color data or other character data in a 300 dpi pixel of the 300 dpi character data storage area 43E corresponding to these four small pixels.

On the other hand, if there is no color data or other character data for any of the four small pixels (S22:NO), then in S24, the CPU 41 records no color data in a corresponding 300 dpi pixel, that is, the CPU 41 does not store any data to the corresponding pixel in the 300 dpi character data storage area 43E.

Next, the CPU 41 determines in S25 whether or not the four small pixels, including two pixels in the main scanning direction by two pixels in the sub-scanning direction, have been read for all 600 dpi character data stored in the input buffer 43A. If not (S25:NO), then the process returns to S21. If so (S25:YES), then the CPU 41 ends the resolution reducing process and returns to S6 of FIG. 4.

Figure 7A:
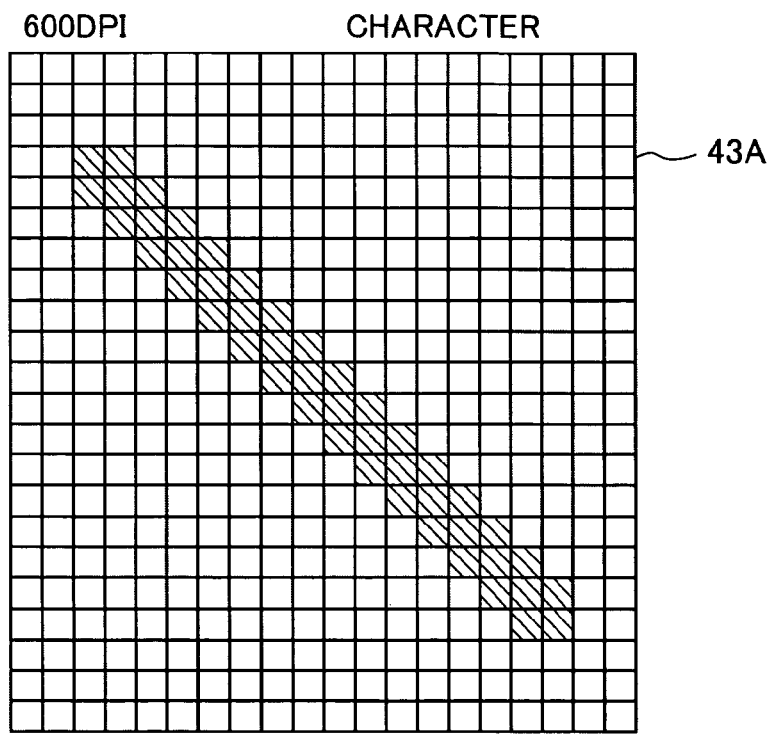
FIG. 7(A) shows an example of 600 dpi character data that was inputted first into the laser printer according to the first embodiment.
Figure 7B:
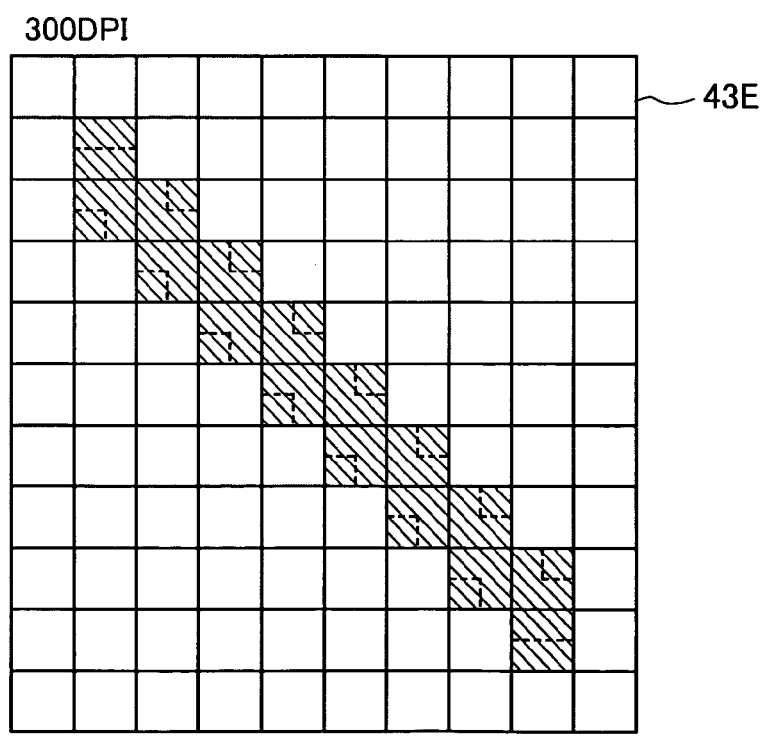
FIG. 7(B) shows 300 dpi character data created from the 600 dpi character data of FIG. 7(A) according to the first embodiment.

That is, as shown in FIGS. 7(A) and 7(B), a pixel in the 300 dpi character data stored in the 300 dpi character data storage area 43E corresponds to a block of four small pixels in the 600 dpi character data, including two pixels in the main scanning direction by two pixels in the sub-scanning direction, in the input buffer 43A. In other words, when each pixel in the 300 dpi character data stored in the 300 dpi character data storage area 43E is divided by two in the main scanning direction and by two in the sub-scanning direction, each divided pixel corresponds to a single pixel in the 600 dpi character data stored in the input buffer 43A.

As described above, if color data or other character data exists in one or more of four small pixels in the 600 dpi character data corresponding to one pixel in the 300 dpi character data (S22:YES), then the color data or other character data is recorded in the corresponding 300 dpi pixel (S23). Hence, when the 600 dpi character data stored in the input buffer 43A is converted to 300 dpi character data, the conjoined area defining the character in the 300 dpi character data stored in the 300 dpi character data storage area 43E expands.

In S6 of FIG. 4, the CPU 41 reads 300 dpi character data from the 300 dpi character data storage area 43E, converts the color data or other character data in each pixel in the 300 dpi character data to 8-bit multi-value data, and stores the 8-bit multi-value data as 300 dpi graphics data (8-bit data) in the 300 dpi superimposed data storage area 43G, overwriting the existing data (combining process).

Since nothing has been stored in the 300 dpi superimposed data storage area 43G at this time, data of each pixel in the 300 dpi character data stored in the 300 dpi character data storage area 43E (which is shown in FIG. 8(A)) is stored in the 300 dpi superimposed data storage area 43G as 300 dpi graphics data (8-bit data), as shown in FIG. 8(B).

Next, the CPU 41 determines in S7 whether or not data remains to be combined (whether all combining processes have been completed). If data remains to be combined (S7:YES), then the CPU 41 returns to S1, where the CPU 41 determines whether or not the second inputted data is character data (600 dpi data). If the CPU 41 determines that the inputted data is not 600 dpi character data (S1:NO), then this means that the second inputted data is 300 dpi image data, and the CPU 41 temporarily stores the 300 dpi image data in the input buffer 43A in S8.

Next in S9, the CPU 41 converts the pixels in the 300 dpi image data temporarily stored in the input buffer 43A into 8-bit multi-value data, thereby creating 300 dpi graphics data (8-bit data), and stores the 300 dpi graphics data in the 300 dpi graphics data storage area 43F. In S10, the CPU 41 reads the 300 dpi graphics data (8-bit data) from the 300 dpi graphics data storage area 43F, stores the 300 dpi graphics data in the 300 dpi superimposed data storage area 43G by superimposing the data over the existing data (combining process), and then advances to S7.

In this example, the 300 dpi graphics data (8-bit data) shown in FIG. 8(B) is stored in the 300 dpi superimposed data storage area 43G, and the 300 dpi graphics data (8-bit data) shown in FIG. 9(A) is superimposed over the graphics data shown in FIG. 8(B) to generate composite graphics data (300 dpi graphics data) shown in FIG. 9(B) in the 300 dpi superimposed data storage area 43G.

In S7, the CPU 41 determines whether any data remains to be combined (whether all combining processes have not been completed). If any data remains to be combined (S7:YES), then the CPU 41 returns to S1. The CPU 41 determines in S1 whether or not the third inputted data is character data (600 dpi data). If the inputted data is determined to be 600 dpi character data (S1:YES), then in S2, the CPU 41 temporarily stores the 600 dpi character data and color (multi-value) data in the input buffer 43A. In S3, the CPU 41 creates 600 dpi character shape data from the 600 dpi character data temporarily stored in the input buffer 43A and stores the 600 dpi character shape data in the 600 dpi character data storage area 43C.

Next in S4, the CPU 41 reads the 600 dpi character shape data from the 600 dpi character data storage area 43C and overwrites a "1" for each pixel in the 600 dpi binary data storage area 43D corresponding to pixels in the 600 dpi character shape data in which character shape data is stored.

Here, a "1" in the binary data storage area 43D receives priority regardless of the character shape data corresponding to the data being overwritten. In other words, when a "1" is already stored in the 600 dpi binary data storage area 43D, the "1" is left unchanged regardless of whether the character shape data corresponding to the data to be overwritten is a "0" or a "1". When the character shape data corresponding to the data to be overwritten is a "0" and a "1" has not been stored in the 600 dpi binary data storage area 43D, then a "0" is stored.

Figures 10A, 10B:
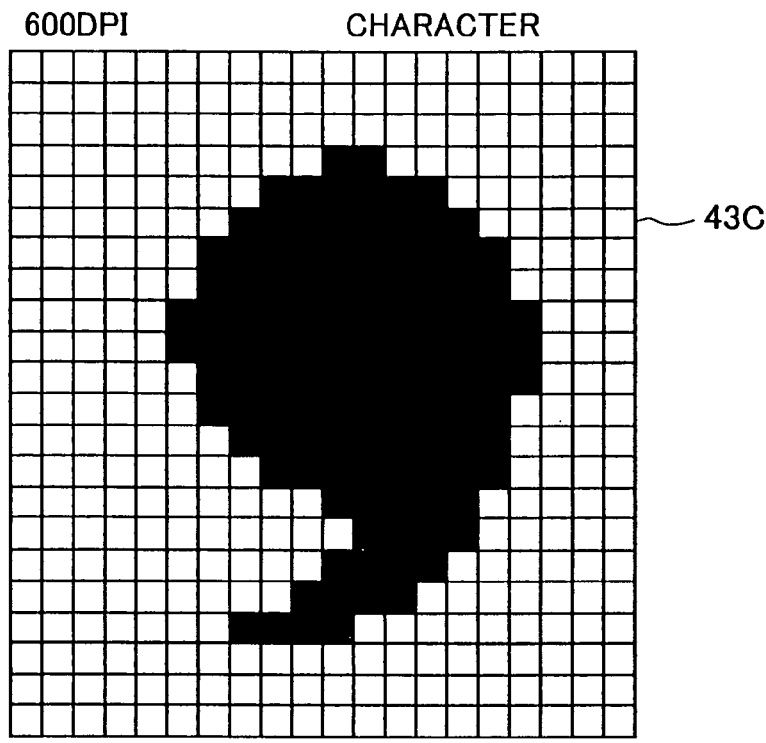
FIG. 10(A) shows 600 dpi character shape data created from 600 dpi character data inputted third into the laser printer according to the first embodiment.
FIG. 10(B) shows 600 dpi binary character shape data created from the 600 dpi character shape data of FIG. 10(A) and the 600 dpi character shape data of FIG. 5(B) according to the first embodiment.

In this example, the 600 dpi binary character shape data shown in FIG. 5(B) is already stored in the 600 dpi binary data storage area 43D, and the 600 dpi character shape data shown in FIG. 10(A) is written according to the rules described above, so that 600 dpi binary character shape data shown in FIG. 10(B) is stored in the 600 dpi binary data storage area 43D.

Figure 11A:
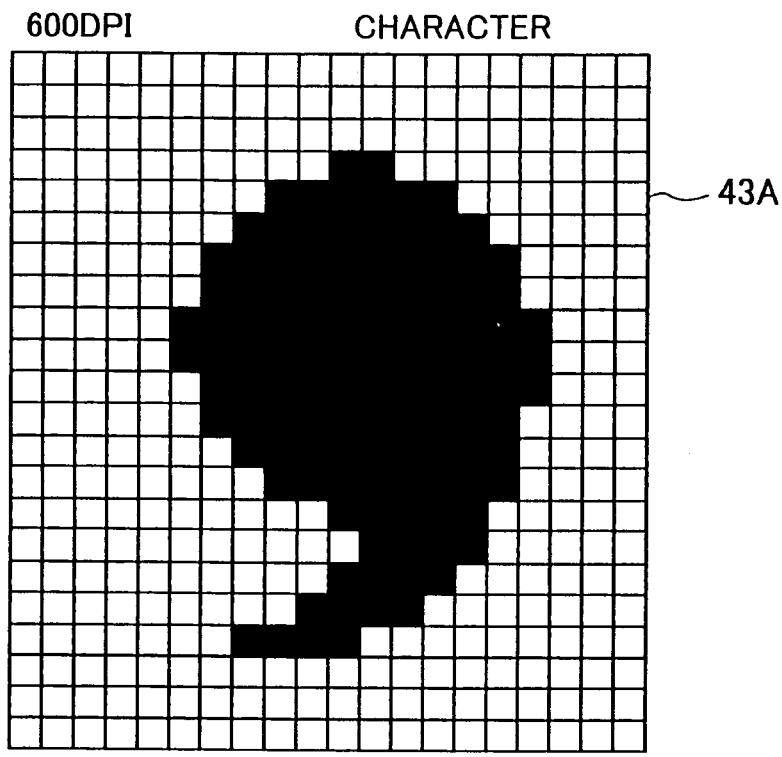
FIG. 11(A) shows an example of 600 dpi character data inputted third into the laser printer according to the first embodiment.
Figure 11B:
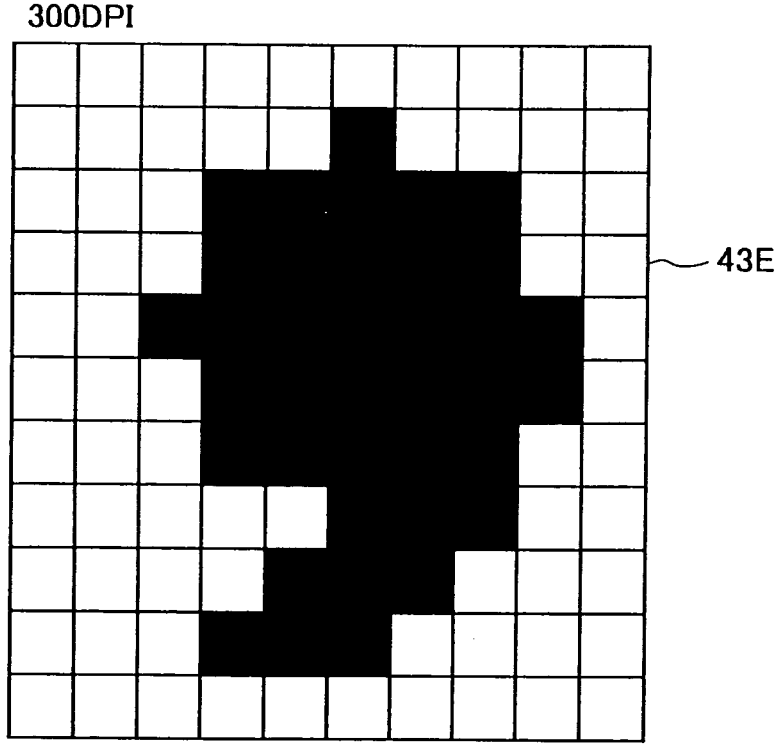
FIG. 11(B) shows 300 dpi character data created from the 600 dpi character data of FIG. 11(B) according to the first embodiment.

Next, in S5 of FIG. 4, the CPU 41 executes the resolution reducing process for converting the third inputted 600 dpi character data shown in FIG. 11(A) stored in the input buffer 43A into 300 dpi character data shown in FIG. 11(B). More specifically, first in S21 of FIG. 6, the CPU 41 sequentially extracts four small pixels, including two pixels in the main scanning direction by two pixels in the sub-scanning direction, from the 600 dpi character data stored in the input buffer 43A. If one or more of the four small pixels in the 600 dpi character data includes color data or other character data (S22:YES), then the color data or other character data is recorded in a corresponding 300 dpi pixel in the 300 dpi character data storage area 43E (S23). However, if none of the four small pixels includes color data or other character data (S22:NO), then nothing is stored in a corresponding 300 dpi pixel in the 300 dpi character data storage area 43E (S24).

If not all two-by-two blocks of small pixels have been extracted from the 600 dpi character data stored in the input buffer 43A (S25:NO), then the CPU 41 repeats the process from S21. However, if all two-by-two blocks of small pixels have been extracted from the 600 dpi character data (S25:YES), then the CPU 41 ends the resolution reducing process and returns to S6 of FIG. 4.

In S6, the CPU 41 again reads the 300 dpi character data stored in the 300 dpi character data storage area 43E, converts the color data or the like for each pixel of the 300 dpi character data into 8-bit multi-value data, and superimposes the multi-value data over the existing data in the 300 dpi superimposed data storage area 43G.

In this example, color data and the like in each pixel of the 300 dpi character data shown in FIG. 12(A) is converted to 8-bit multi-value data, and the 8-bit multi-value data is superimposed as 300 dpi graphics data over the 300 dpi graphics data (8-bit data) shown in FIG. 9(B) that is stored in the 600 dpi superimposed data storage area 43G, thereby generating 300 dpi graphics data in the 300 dpi superimposed data storage area 43G as shown in FIG. 12(B).

Next, the CPU 41 determines in S7 whether data remains to be combined (whether all combining processes have not been completed). If data remains to be combined (S7:YES), then the CPU 41 returns to S1 and executes the process described above.

However, if no data remains to be combined (all combining processes have been completed) (S7:NO), then in S11, the CPU 41 performs a resolution increasing process for converting the 300 dpi graphics data (8-bit data) stored in the 300 dpi superimposed data storage area 43G shown in FIG. 13(A) into 600 dpi graphics data (8-bit data) shown in FIG. 13(B). That is, the CPU 41 reads the 300 dpi graphics data (8-bit data) from the 300 dpi superimposed data storage area 43G, dividing each pixel in the 300 dpi graphics data by two in the main scanning direction and two in the sub-scanning direction to obtain four small pixels for each pixel of the 300 dpi graphics data and stores the 8-bit data of the pixel of the 300 dpi graphics data into corresponding four pixels in the 600 dpi converted data storage area 43H. In this manner, 600 dpi graphics data is stored in the 600 dpi converted data storage area 43H as shown in FIG. 13(B).

In S12, the CPU 41 executes the first correction process. In this process, the CPU 41 sequentially reads four small pixels (x1, x2, y1, y2), including two pixels in the main scanning direction by two pixels in the sub-scanning direction, from the 600 dpi binary character shape data stored in the 600 dpi binary data storage area 43D. At the same time, the CPU 41 sequentially reads four small pixels (x11, x12, y11, y12), corresponding to the four small pixels (x1, x2, y1, y2) of the 600 dpi binary character shape data, from the 600 dpi graphics data (8-bit data) stored in the 600 dpi converted data storage area 43H. In addition, the CPU 41 reads the first correction table 55 from the first correction table storage area 42A in the ROM 42.

Next, the CPU 41 stores the four small pixels (x1, x2, y1, y2) of the 600 dpi binary character shape data as four small pixels (X1, X2, Y1, Y2) of the "600 dpi binary data" in the first correction table 55 (FIG. 3) and the four small pixels (x11, x12, y11, y12) as four small pixels (X11, X12, Y12, Y12) of the "600 dpi multi-value data" in the first correction table 55. The CPU 41 sequentially creates four small pixels (X21, X22, X21, X22) of the "first correction data" in the first correction table 55, based on the corresponding four small pixels (X1, X2, Y1, Y2) of the "600 dpi binary data" and corresponding four small pixels (X1, X12, Y12, Y12) of the "600 dpi multi-value data", in a following manner.

That is, if the binary data in the four small pixels (X1, X2, Y1, Y2) is (0, 0, 0, 0) or (1, 1, 1, 1), then the multi-value data in the corresponding four small pixels (X21, X22, Y21, Y22) of the "first correction data" is assigned the multi-value data in the four small pixels (X11, X12, Y11, Y12) of the "600 dpi multi-value data".

In other words, the pixel X21 of the "first correction data" is assigned the multi-value data in the pixel X1 of the "600 dpi multi-value data", while the pixel X22 is assigned the multi-value data in the pixel X12 of the "600 dpi multi-value data". Further, the pixel Y21 is assigned the multi-value data of the pixel Y11, while the pixel Y22 is assigned the multi-value data in the pixel Y12.

However, if the binary data for the pixels (X1, X2, Y1, Y2) is neither (0, 0, 0, 0) nor (1, 1, 1, 1), then pixels among (X21, X22, Y21, Y22) in the "first correction data" that correspond to a "1" in the binary data for the pixels (X1, X2, Y1, Y2) are assigned the multi-value data from the corresponding pixel (X11, X12, Y11, Y12). Pixels among (X21, X22, Y21, Y22) corresponding to a "0" in the binary data for the pixels (X1, X2, Y1, Y2) are not assigned multi-value data from the corresponding pixel (X11, X12, Y11, Y12), but blank data.

For example, if the binary data for the four small pixels (X1, X2, Y1, Y2) is (0, 1, 1, 1), then the pixel X21 of the "first correction data" is assigned blank-correction data, while the pixel X22 is assigned the multi-value data for the pixel X12. Further, the pixels Y21 and Y22 are assigned the multi-value data for the pixels Y11 and Y12, respectively.

Then, four small pixels (x21, x22, y21, y22) corresponding to the small pixels (X21, X22, Y21, Y22) of the "first correction data" in the first correction table 55 are created and stored into the correction data storage area 43I. In this manner, first correction data, which is 600 dpi graphics data (8-bit data), is stored in the correction data storage area 43I.

In this example, from the 600 dpi binary character shape data stored in the 600 dpi binary data storage area 43D shown in FIG. 14(A) and the 600 dpi graphics data (8-bit data) stored in the 600 dpi converted data storage area 43H shown in FIG. 14(B), first correction data shown in FIG. 14(C) is created and stored in the correction data storage area 43I.

In this way, 300 dpi character data formed over the 600 dpi graphics data is corrected to 600 dpi character data.

Next in S13, the CPU 41 executes a second correction process. In the second correction process, the CPU 41 reads the first correction data from the correction data storage area 43I. The CPU 41 sequentially extracts in the main scanning direction each 600 dpi pixel in the first correction data in which blank-correction data has been stored. If a pixel for image data (non-character pixels) is adjacent to the pixel possessing blank-correction data on the left or right, then the CPU 41 records the 600 dpi graphics data from the outermost image-data pixel (non-character pixel) among the left and right adjacent pixels in place of the blank-correction data and stores the result as second correction data in the second correction data storage area 43J.

If pixels for image data (non-character pixel) are not adjacent to the pixel possessing the blank-correction data on the left and right, and if pixels for image data (non-character pixels) is adjacent to the pixel possessing blank-correction data on the above or below, then the blank-correction data is replaced by the 600 dpi graphics data for the outermost image-data pixel (non-character pixel) from among the neighboring pixels above and below the pixel possessing the blank-correction data, and the result is stored in the second correction data storage area 43J as the second correction data. If pixels for image data (non-character pixel) are not adjacent to the pixel possessing the blank-correction data on the left, right, above, and below, then the blank-correction data is stored in the second correction data storage area 43J without being replaced.

When a 600 dpi pixel for the 600 dpi first correction data read from the correction data storage area 43I does not possess blank-correction data, the 600 dpi graphics data (8-bit data) for the pixel is recorded unchanged and stored as the second correction data in the second correction data storage area 43J.

In this way, 600 dpi graphics data for background image or the like is recorded in pixels in the correction data storage area 43I that corresponds to pixels in which blank-correction data was recorded during the first correction process of S12.

In this example, the first correction data in the correction data storage area 43I shown in FIG. 15(A) is converted into second correction data and stored in the second correction data storage area 43J as shown in FIG. 15(B).

In S14, the CPU 41 reads the second correction data from the second correction data storage area 43J and stores this data as print output data in the output buffer 43B. Hence, the superimposed 600 dpi character data and 300 dpi image data are both printed via the printer engine 53 at 600 dpi printing density.

As described above, the laser printer 1 according to the first embodiment receives 600 dpi character data from the external PC 47, creates 600 dpi binary character shape data from the 600 dpi character data, and writes the 600 dpi binary character shape data sequentially in the 600 dpi binary data storage area 43D (S2-S4). Also, the CPU 41 converts 600 dpi character data and 300 dpi image data inputted from the external PC 47 into 300 dpi 8-bit multi-value graphics data and stores the same in the 300 dpi superimposed data storage area 43G (S5, S6, S9, and S10). Then, the CPU 41 divides each pixel in the 300 dpi 8-bit graphics data into four small pixels to create 600 dpi 8-bit graphics data (S11) The 600 dpi binary character shape data is subjected to the first and second correction processes using the first correction table 55, after which the superimposed 600 dpi character data and 300 dpi image data are both printed at 600 dpi printing density (S12-S14).

Therefore, the 300 dpi character data converted from 600 dpi character data that is superimposed over 300 dpi image data can be corrected to 600 dpi character data. Accordingly, when a portion of the 600 dpi character data overlaps the 300 dpi image data, the portion of the 600 dpi character can be combined and printed over a 300 dpi photograph or background image with almost no change, resulting in a more satisfactory printing output.

Also, if the conjoined area defining a character in the 300 dpi character data expands when converting the 600 dpi character data to the 300 dpi character data, the second correction process (S13) corrects this problem by replacing blank-correction data with 8-bit multi-value data of a pixel representing the image or background from among pixels that are adjacent to pixels storing the blank-correction data. Accordingly, it is possible to improve the sharpness of a character having 600 dpi resolution that is drawn over a 300 dpi photograph or background image, resulting in a more satisfactory printing quality.

In the above example, a portion of high-resolution character data overlaps a portion of low-resolution image data. However, even if the entire high-resolution character data overlaps the low-resolution image data, these two forms of data can be combined and printed in the same manner.

SECOND EXAMPLE

Below, a second example in which the entire 600 dpi character data is superimposed over 300 dpi image data according to a second embodiment of the present invention will be described with reference to FIGS. 16-22. In this example, it is assumed that 300 dpi image data and 600 dpi character data are inputted into the laser printer 1 in this order.

First in S1 of FIG. 4, the CPU 41 determines whether the inputted data is character data (600 dpi data). If not (S1:NO), then this means that the inputted data is 300 dpi image data, and the CPU 41 temporarily stores the 300 dpi image data in the input buffer 43A (S8). In S9, the CPU 41 converts each pixel in the 300 dpi image data temporarily stored in the input buffer 43A into 8-bit multi-value data to generate 300 dpi graphics data (8-bit data) and stores this graphics data in the 300 dpi graphics data storage area 43F as shown in FIG. 16(A). Next in S10, the CPU 41 reads the 300 dpi graphics data (8-bit data) from the 300 dpi graphics data storage area 43F and writes this data over existing data in the 300 dpi superimposed data storage area 43G (S10) as shown in FIG. 16(B).

Figures 17A, 17B:
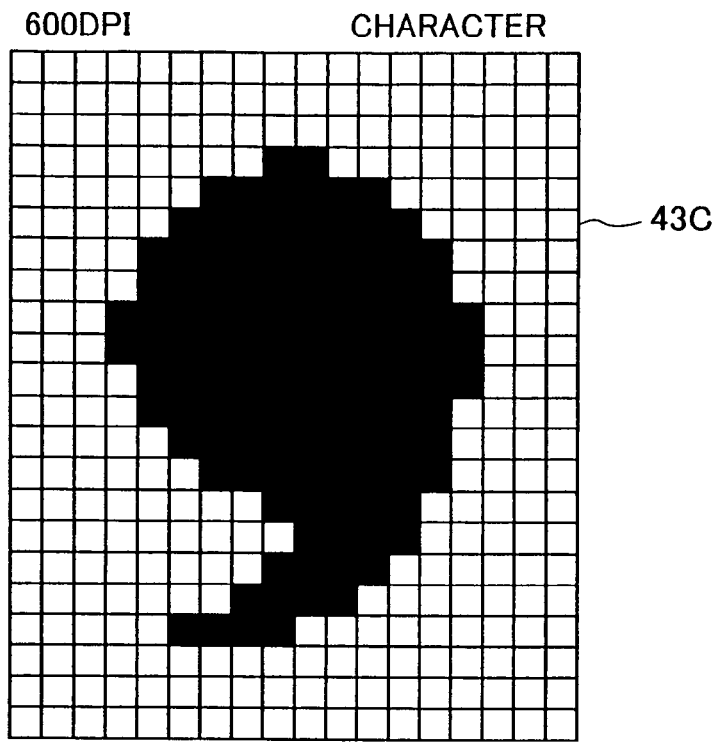
FIG. 17(A) shows a second example of 600 dpi character shape data created from 600 dpi character data inputted second into the laser printer according to the first embodiment.
FIG. 17(B) shows 600 dpi binary character shape data created from the 600 dpi character shape data of FIG. 17(A)

Next in S1, the CPU 41 determines whether or not the second inputted data is character data (600 dpi data). If so (S1:YES), then the CPU 41 temporarily stores the 600 dpi character data and color (multi-value) data in the input buffer 43A in S2. The CPU 41 creates 600 dpi character shape data from the 600 dpi character data temporarily stored in the input buffer 43A and stores the generated data in the 600 dpi character data storage area 43C (S3). Next, as shown in FIGS. 17(A) and 17(B), the CPU 41 reads the 600 dpi character shape data from the 600 dpi character data storage area 43C and stores 600 dpi binary character shape data in the 600 dpi binary data storage area 43D (S4). Here, the CPU 41 records a "1" in each pixel of the 600 dpi binary data storage area 43D corresponding to a pixel in which character shape data is stored and stores a "0" in each pixel of the 600 dpi binary data storage area 43D corresponding to a pixel in which no character shape data is stored.

The CPU 41 executes the resolution reducing process (S5) to convert the 600 dpi character data shown in FIG. 18(A) to 300 dpi character data shown in FIG. 18(B). That is, the CPU 41 generates 300 dpi character data from the 600 dpi character data temporarily stored in the input buffer 43A and stores the resulting data in the 300 dpi character data storage area 43E.

As shown in FIGS. 19(A) and 19(B), the CPU 41 reads the 300 dpi character data stored in the 300 dpi character data storage area 43E, converts color data and the like for each pixel in the 300 dpi character data to 8-bit multi-value data, and stores the 8-bit multi-value data as 300 dpi graphics data (8-bit data) in the 300 dpi superimposed data storage area 43G over the existing data (S6).

Next, as shown in FIGS. 20(A) and 20(B), the CPU 41 reads the 300 dpi graphics data (8-bit data) from the 300 dpi superimposed data storage area 43G and divides each pixel by two in the main scanning direction and by two in the sub-scanning direction to generate four small pixels. The 8-bit multi-value data in the pixel of the 300 dpi graphics data is stored in each of the corresponding divided four small pixels to generate 600 dpi graphics data (8-bit data). The CPU 41 stores the 600 dpi graphics data in the 600 dpi converted data storage area 43H (S11).

Next, the CPU 41 executes the first correction process (S12) to create and store first correction data in the correction data storage area 43I shown in FIG. 21(C) from the 600 dpi binary character shape data stored in the 600 dpi binary data storage area 43D shown in FIG. 21(A) and the 600 dpi graphics data stored in the 600 dpi converted data storage area 43H shown in FIG. 21(B) by using the first correction table 55 in the manner described above.

Next, as shown in FIGS. 22(A) and 22(B), the CPU 41 executes the second correction process to create and store second correction data in the second correction data storage area 43J (S13). That is, the CPU 41 records 600 dpi graphics data (8-bit data), such as a background image, in pixels corresponding to pixels of the first correction data in which blank-correction data was recorded in the first correction process.

The CPU 41 reads the second correction data from the second correction data storage area 43J and stores the second correction data as print output data in the output buffer 43B. Accordingly, the print output data is printed through the printer engine 53 at a uniform 600 dpi printing density (S14).

As described above, according to the first embodiment, even when all of the 600 dpi character data overlaps the 300 dpi image data, the entire 600 dpi character can be combined and printed over a 300 dpi photograph or background image with almost no change, resulting in a more satisfactory printing output.

Second Embodiment

Next, an image processing method according to a second embodiment of the present invention will be described. Because the image processing method according to the second embodiment is similar to that of the first embodiment, only processes that differ from the processes of the first embodiment will be described.

In the above-described first embodiment, when converting 600 dpi character data stored in the input buffer 43A to 300 dpi character data, the conjoined area defining the character in the 300 dpi character data stored in the 300 dpi character data storage area 43E tends to expand (S21-S25). However, according to the second embodiment, the conjoined area defining the character in the 300 dpi character data stored in the 300 dpi character data storage area 43E tends to compress.

That is, in the first embodiment, the CPU 41 determines in S22 whether one or more of four pixels of the 600 dpi character data in the input buffer 43A possesses color data or other character data, and if any one or more of the four pixels possess color data or other data (S22:YES), then the process proceeds to S23, and if none of the four pixels possesses color data or other character data (S22:NO), then the process proceeds to S24. However, in the second embodiment, the process in S22 of the first embodiment is replaced with a process for determining whether all of the four pixels possess color data or other character data. Then, if all of the four pixels possess color data or other character data, then the process proceeds to S23. On the other hand, if one or more of the four pixels does not possess color data or other character data, then the process proceeds to S24.

Also, in the second correction process of S13, the CPU 41 sequentially extracts in the main scanning direction 600 dpi pixels from the first correction data stored in the correction data storage area 43I when the pixels possess blank-correction data that was stored in the first correction process of S12. The CPU 41 replaces the blank-correction data with character data (8-bit data) for the innermost 600 dpi character pixel from among the pixels possessing the character data on the left and right or top and bottom. The resulting data is stored as second correction data in the second correction data storage area 43J.

In this embodiment also, the laser printer 1 can correct 300 dpi character data converted from 600 dpi character data that has been superimposed on 300 dpi image data back to 600 dpi character data. Accordingly, when all or part of the 600 dpi character data overlaps the 300 dpi image data, the part or the entire 600 dpi character can be combined and printed over a 300 dpi photograph or background image with almost no change, resulting in a more satisfactory printing output.

Also, even if the conjoined area defining a character in the 300 dpi character data contracts by converting the 600 dpi character data to 300 dpi character data, the second correction process corrects this problem by substituting 8-bit multi-value data for pixels representing the character from among pixels that are adjacent to pixels storing the blank-correction data. Accordingly, it is possible to improve the sharpness of a character having 600 dpi resolution that is drawn over a 300 dpi photograph or background image, resulting in a more satisfactory printing quality.

Third Embodiment

Next, an image processing method according to a third embodiment of the present invention will be described. Because the image processing method according to the third embodiment is similar to that of the first embodiment, only processes that differ from the processes of the first embodiment will be described.

In the first embodiment, the second correction process is executed in S13. However, in the third embodiment, the process of S13 is skipped when the resolution of character data inputted from the external PC 47 exceeds a prescribed resolution (for example 2400 dpi, 3600 dpi, or 6000 dpi), and the first correction data produced from the first correction process of S12 is stored in the output buffer 43B as print output data and printed via the printer engine 53 at a uniform printing density of the corresponding resolution.

Since the second correction data storage area 43J is unnecessary in this case, the storage capacity of the RAM 43 can be reduced, thereby improving image processing speed.

Fourth Embodiment

Next, an image processing method according to a fourth embodiment of the present invention will be described. Because the image processing method according to the fourth embodiment is similar to that of the first embodiment, only processes that differ from the processes of the first embodiment will be described.

In the first embodiment described above, monochromatic high-resolution character data is superimposed on low-resolution image data. However, the present embodiment describes the case of superimposing color high-resolution character data on color low-resolution image data.

Figure 23A:
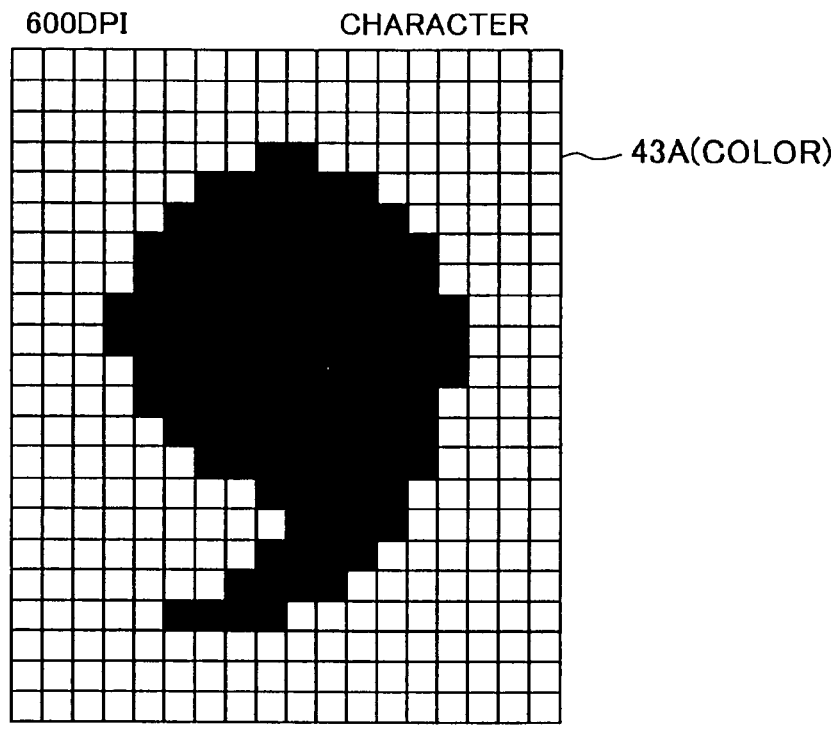
FIG. 23(A) shows an example of 600 dpi color character data inputted second into the laser printer according to a fourth embodiment of the present invention.
Figure 23B:
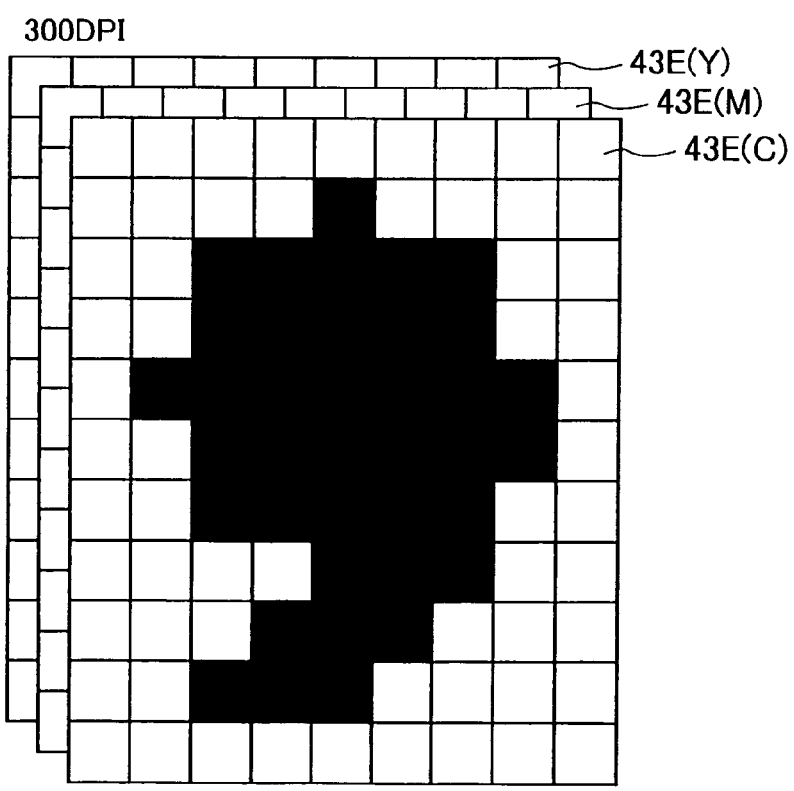
FIG. 23(B) shows 300 dpi character data corresponding to colors cyan (C), magenta (M), and yellow (Y) created from the 600 dpi color character data of FIG. 23(A) according to the fourth embodiment of the present invention.

In the resolution reducing process of S5, color 600 dpi character data is converted into 300 dpi character data for each of the colors cyan (C), magenta (M), and yellow (Y), as shown in FIGS. 23(A) and 23(B). Then, processes similar to that of the first embodiment are performed. That is, using the 300 dpi character data for each color, the CPU 41 creates 600 dpi multi-value graphics data corresponding to each of the colors cyan (C), magenta (M), and yellow (Y) through the processes of S6 and S11. However, in the process of S4 the CPU 41 creates only one unit of 600 dpi binary character shape data for the color 600 dpi character data.

In the process of S12, the CPU 41 performs the first correction process based on the 600 dpi multi-value graphics data corresponding to each of the colors cyan (C), magenta (M), and yellow (Y) and the 600 dpi binary character shape data. Subsequently, in the process of S13, the CPU 41 executes the second correction process for replacing blank-correction data in pixels of the 600 dpi graphics data corresponding to each of the colors cyan (C), magenta (M), and yellow (Y). By storing the 600 dpi graphics data corresponding to each of the colors cyan (C), magenta (M), and yellow (Y) produced in the second correction process in the output buffer 43B in S14, the entire color 600 dpi character can be combined and printed with almost no change over the 300 dpi color photograph or color background image.

Accordingly, even when the entire 600 dpi color character data overlaps the 300 dpi color image data, it is possible to combine the two types of data and print the entire color 600 dpi character nearly unchanged over the top of a 300 dpi color photograph or color background image, thereby achieving satisfactory printing results. Also, since it is necessary to create only a single unit of 600 dpi character shape data for each color 600 dpi character data, it is possible to reduce the amount of memory required for the color image data process.

Further, the high-resolution character data is converted to low-resolution character data corresponding to three colors. Accordingly, much less memory capacity is required than when converting high-resolution character data to high-resolution character data corresponding to three colors, thereby reducing manufacturing costs.

Fifth Embodiment

Next, an image processing method according to a fifth embodiment of the present invention will be described.

Because the image processing method according to the fifth embodiment is similar to that of the first embodiment, only processes that differ from the processes of the first embodiment will be described.

In the resolution reducing process of S5 in the first embodiment described above, monochromatic 600 dpi character data is converted to 300 dpi character data. However, in this embodiment, color 600 dpi character data is converted into 300 dpi character data for each of the colors cyan (C), magenta (M), yellow (Y), and black (BK) as shown in FIGS. 24(A) and 24(B). The subsequent processes are similar to those described in the first embodiment (S6-S14).

That is, using the 300 dpi character data for each color of the colors black (BK), cyan (C), magenta (M), and yellow (Y), the CPU 41 creates 600 dpi multi-value data corresponding to each of the colors black (BK), cyan (C), magenta (M), and yellow (Y) through the processes of S6 and S11. However, in the process of S4 the CPU 41 creates only one unit of 600 dpi binary character shape data for the color 600 dpi character data.

In S12, the CPU 41 performs the first correction process based on the 600 dpi multi-value data corresponding to each of the colors black (BK), cyan (C), magenta (M), and yellow (Y) and the 600 dpi binary character shape data. Subsequently, in S13, the CPU 41 executes the second correction process for replacing blank-correction data in pixels of the 600 dpi graphics data corresponding to each of the colors black (BK), cyan (C), magenta (M), and yellow (Y). The 600 dpi graphics data corresponding to each of the colors black (BK), cyan (C), magenta (M), and yellow (Y) produced in the second correction process is stored in the output buffer 43B in S14, so that the entire color 600 dpi character is combined and printed with almost no change over the 300 dpi color photograph or color background image.

As described above, when all of the 600 dpi color character data overlaps the 300 dpi color image data, it is possible to synthesize the two types of data and print the entire color 600 dpi character nearly unchanged over the top of a 300 dpi color photograph or color background image, thereby achieving satisfactory printing results. Also, since it is necessary to create only a single unit of 600 dpi character shape data for each color 600 dpi character data, it is possible to reduce the amount of memory required for the color image data process.

Further, the high-resolution character data is converted to low-resolution character data corresponding to four colors. Accordingly, much less memory capacity is required than when converting high-resolution character data to high-resolution character data corresponding to four colors, thereby reducing manufacturing costs.

Moreover, even if the high-resolution character data is composed of color data, the character data need only be converted to a single unit of high-resolution binary data. Since the high-resolution character data need not be converted to character data corresponding to three or four colors, the required memory capacity can be greatly reduced, thereby reducing manufacturing costs.

While some exemplary embodiments of this invention have been described in detail, those skilled in the art will recognize that there are many possible modifications and variations which may be made in these exemplary embodiments while yet retaining many of the novel features and advantages of the invention.

What is claimed is:

1. An image-processing device comprising:
   a first memory;
   a second memory;
   a controller that converts a high-resolution character data to a high-resolution binary data, stores the high-resolution binary data into the first memory, converts the high-resolution character data to a low-resolution character data, stores the low-resolution character data and a low-resolution image data as low-resolution composite data into the second memory, converts the low-resolution composite data into a high-resolution multi-value composite data, corrects the high-resolution multi-value composite data to a corrected high-resolution multi-value composite data by using a logic filter table that employs the high-resolution binary data stored in the first memory, and corrects the corrected high-resolution multi-value composite data by assigning to a blank pixel in the corrected high-resolution multi-value composite data, that was generated when correcting the high-resolution multi-value composite data, one of a value of a pixel adjacent to the blank pixel and a blank value.

2. The image-processing device according to claim 1, wherein if the controller has expanded a conjoined area defining a character in the low-resolution character data when converting the high-resolution character data to the low-resolution character data, then the controller corrects the corrected high-resolution multi-value composite data by assigning to the blank pixel a value from among pixels adjacent to the blank pixel that indicates an image or background.

3. The image-processing device according to claim 1, wherein if the controller has contracted a conjoined area defining a character in the low-resolution character data when converting the high-resolution character data to the low-resolution character data, then the controller corrects the corrected high-resolution multi-value composite data by assigning to the blank pixel a value from among pixels adjacent to the blank pixel that indicates a character.

4. The image-processing device according to claim 1, wherein the high-resolution character data and the low-resolution image data are color data, and the controller converts the high-resolution character data to the low-resolution character data corresponding to three or four colors.

5. An image-processing device comprising:
   a first converting means for converting a high-resolution character data to a high-resolution binary data;
   a first storing means for storing the high resolution character data;
   a second converting means for converting the high-resolution character data to a low-resolution character data;
   a second storing means for storing the low-resolution character data and a low-resolution image data as low-resolution composite data;

a third converting means for converting the low-resolution composite data into a high-resolution multi-value composite data;

a first correcting means for correcting the high-resolution multi-value composite data by using a logic filter table that employs the high-resolution binary data stored in the first memory; and a second correcting means for correcting the high-resolution multi-value composite data corrected by the first correcting means by assigning to blank pixels in the corrected high-resolution multi-value composite data that was generated when the first correcting means corrected the high-resolution multi-value composite data, one of a value of a pixel adjacent to the blank pixel and a blank value.

6. The image-processing device according to claim 5, wherein if the second converting means has expanded a conjoined area defining a character in the low-resolution character data when converting the high-resolution character data to the low-resolution character data, then the second correcting means corrects the corrected high-resolution multi-value composite data by assigning to the blank pixel a value from among pixels adjacent to the blank pixel that indicates an image or background.

7. The image-processing device according to claim 5, wherein if the second converting means has contracted a conjoined area defining a character in the low-resolution character data when converting the high-resolution character data to the low-resolution character data, then the second correcting means corrects the corrected high-resolution multi-value composite data by assigning to the blank pixel a value from among pixels adjacent to the blank pixel that indicates a character.

8. The image-processing device according to claim 5, wherein the high-resolution character data and the low-resolution image data are color data, and the second converting means converts the high-resolution character data to the low-resolution character data corresponding to three or four colors.

9. An image-processing method for superimposing and outputting high-resolution character data and low-resolution image data, comprising:
   a) converting a high-resolution character data into a high-resolution binary data;
   b) developing and storing the high-resolution binary data in a high-resolution binary memory;
   c) converting the high-resolution character data to low-resolution character data;
   d) developing a low-resolution image data and the low-resolution character data converted from the high-resolution character data in a low-resolution multi-value memory, thereby storing a developed data in the low-resolution multi-value memory as a low-resolution composite data;
   e) converting the low-resolution composite data stored in the low-resolution multi-value memory into a high-resolution multi-value composite data;
   f) correcting the high-resolution multi-value composite data using a logic filter table that employs the high-resolution binary data stored in the high-resolution binary memory; and
   g) correcting the high-resolution multi-value composite data corrected in the step f) by assigning to a blank pixel in the high-resolution composite data generated through the step f) one of a value of a pixel adjacent to the blank pixel and a blank value.

10. The image-processing method according to claim 9, wherein, in the step g), the blank pixel is assigned a value from among pixels adjacent to the blank pixel that indicates an image or background if a conjoined area defining the character in the low-resolution character data expands when the high-resolution character data is converted to the low-resolution character data in the step c).

11. The image-processing method according to claim 9, in the step g), the blank pixel is assigned a value from among pixels adjacent to the blank pixel that indicates a character if a conjoined area defining the character in the low-resolution character data contracts when the high-resolution character data is converted to the low-resolution character data in the step c).

12. The image-processing method according to claim 9, wherein the high-resolution character data and the low-resolution image data are color data, and the low-resolution character data converted from the high-resolution character data in the step c) corresponds to three or four colors, and in the step d) the low-resolution character data corresponding to three or four colors is developed and stored in the low-resolution multi-value memory as the low-resolution composite data.

* * * * *